(12) United States Patent
Zhao et al.

(10) Patent No.: US 11,424,844 B2
(45) Date of Patent: Aug. 23, 2022

(54) FREQUENCY SPECTRUM MANAGEMENT DEVICE, SYSTEM, METHOD AND COMPUTER READABLE STORAGE MEDIUM

(71) Applicant: Sony Corporation, Tokyo (JP)

(72) Inventors: Youping Zhao, Beijing (CN); Lu Shi, Beijing (CN); Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 155 days.

(21) Appl. No.: 16/970,953

(22) PCT Filed: Feb. 22, 2019

(86) PCT No.: PCT/CN2019/075782
§ 371 (c)(1),
(2) Date: Aug. 19, 2020

(87) PCT Pub. No.: WO2019/165932
PCT Pub. Date: Sep. 6, 2019

(65) Prior Publication Data
US 2021/0006342 A1      Jan. 7, 2021

(30) Foreign Application Priority Data

Feb. 28, 2018   (CN) .......................... 201810166390.8

(51) Int. Cl.
*H04B 17/345*      (2015.01)
*H04B 17/382*      (2015.01)
(Continued)

(52) U.S. Cl.
CPC ......... *H04B 17/345* (2015.01); *G06N 3/0445* (2013.01); *G06N 3/08* (2013.01);
(Continued)

(58) Field of Classification Search
CPC .............................. H04W 16/14; H04W 16/24
(Continued)

(56) References Cited

U.S. PATENT DOCUMENTS

2006/0203295 A1     9/2006   D'Silva et al.
2014/0161002 A1*    6/2014   Gauvreau ............. H04L 5/0055
                                                            370/280
(Continued)

FOREIGN PATENT DOCUMENTS

| CN | 101803431 A   | 8/2010 |
| CN | 103765939 A   | 4/2014 |
| WO | 2016/040598 A1 | 3/2016 |

OTHER PUBLICATIONS

International Search Report and Written Opinion dated May 24, 2019 for PCT/CN2019/075782 filed on Feb. 22, 2019, 9 pages including English Translation of the International Search Report.
(Continued)

*Primary Examiner* — Kiet M Doan
(74) *Attorney, Agent, or Firm* — Xsensus LLP

(57) ABSTRACT

A frequency spectrum management device includes a processing circuit configured to acquire, with regard to a position of a primary user sample, a plurality pieces of sample information, each of the plurality pieces of sample information comprising information of a plurality of secondary user samples, and an aggregate interference generated by the plurality of secondary users on the primary user sample; and training a neural network model by taking the information of the plurality of secondary user samples as an input of the neural network model and taking the aggregate interference generated by the plurality of secondary user samples on the primary user sample as an output of the neural network model, so as to determine a parameter set of the neural network model corresponding to the position of the primary user sample.

18 Claims, 14 Drawing Sheets

(51) Int. Cl.
*G06N 3/04* (2006.01)
*G06N 3/08* (2006.01)
*H04W 16/14* (2009.01)
*H04W 72/04* (2009.01)
*H04W 72/08* (2009.01)

(52) U.S. Cl.
CPC .......... *H04B 17/382* (2015.01); *H04W 16/14* (2013.01); *H04W 72/048* (2013.01); *H04W 72/082* (2013.01)

(58) Field of Classification Search
USPC ............... 455/436, 67.11, 454; 370/252, 280
See application file for complete search history.

(56) References Cited

U.S. PATENT DOCUMENTS

2016/0006499 A1* 1/2016 Jeong ................. H04B 7/18523 455/12.1
2017/0199120 A1* 7/2017 Liu .................... G01N 21/3554
2019/0258927 A1* 8/2019 Chen ........................ G06N 3/08
2019/0354860 A1* 11/2019 Karg ........................ B60Q 9/00

OTHER PUBLICATIONS

Yin, L., "Key Research On Spectrum Capacity and Spectrum Traffic Modeling in Cognitive Radio Networks," Thesis for the Doctorate of Beijing University of Posts and Telecommunications, May 9, 2013, 8 pages.

Ana Galindo-Serrano et al: "Distributed Q-Learning for Aggregated Interference Control in Cognitive Radio Networks", IEEE Transactons on Vehicular Technology,IEEE Service Center, vol. 59, No. 4, May 1, 2010 (May 1, 2010),pp. 1823-1834, XP011302923.

Extended European Search Report dated Dec. 16, 2020, in corresponding European Patent Application No. 19760269.1.

* cited by examiner

FREQUENCY SPECTRUM MANAGEMENT DEVICE, SYSTEM, METHOD AND COMPUTER READABLE STORAGE MEDIUM

CROSS-REFERENCE TO RELATED APPLICATIONS

The present application is based on PCT filing PCT/CN2019/075782, filed Feb. 22, 2019, and claims priority to Chinese Patent Application No. 201810166390.8, filed Feb. 28, 2018 with the Chinese Patent Office, each of which is incorporated herein by reference in its entirety.

FIELD

Embodiments of the present disclosure generally relate to the field of radio communications, particularly to a spectrum management apparatus, a spectrum management system, a radio communication method performed by a spectrum management apparatus, and a computer readable storage medium. More particularly, the present disclosure relates to a spectrum management apparatus for training a neural network model to calculate aggregate interference, a spectrum management apparatus for calculating aggregate interference by using a neural network model, a method for training a neural network model to calculate aggregate interference, a method for calculating aggregate interference by using a neural network model, and a computer readable storage medium.

BACKGROUND

In a cognitive radio system, an unauthorized user may dynamically access an authorized spectrum under a restraint of certain rules, thereby improving spectrum utilization greatly while mitigating scarcity of spectrum resources to a certain extent. A user using the authorized spectrum is referred to as a primary user (PU). The unauthorized user dynamically accessing the authorized spectrum based on the certain rules is referred to as a secondary user (SU). The secondary user may produce interference to the primary user when sharing the same spectrum with the primary user. In a case that the number of the secondary user sharing the same spectrum with the primary user is more than one, a sum of interferences produced by the more than one secondary user to the primary user is referred to as aggregate interference.

In a conventional calculation method, aggregate interference produced by multiple secondary users to a primary user is calculated from the viewpoint of statistics. That is, a distribution of the aggregate interference is determined based on assumed channel environment and space distribution type of users in a fixed scenario. However, in an actual system, since environment conditions are complex and volatile, and a distribution of the users is changed dynamically, the conventional calculation method is not suitable for the actual system and the aggregate interference calculated inaccurately.

Therefore, it is required to provide a technical solution to accurately calculate a value of the aggregate interference produced by multiple secondary users to a primary user based on an actual environmental condition and an actual distribution of users, thereby performing spectrum management reasonably.

SUMMARY

This summary part provides a general summary of the present disclosure, rather than discloses a full scope or all features thereof.

An object of the present disclosure is to provide a spectrum management apparatus, a spectrum management system, a radio communication method performed by a spectrum management apparatus and a computer readable storage medium to calculate a value of the aggregate interference produced by multiple secondary users to a primary user based on an actual environmental condition and an actual distribution of users, thereby performing spectrum management reasonably.

According to an aspect of the present disclosure, a spectrum management apparatus is provided. The spectrum management apparatus includes processing circuitry configured to: acquire multiple pieces of sample information with respect to a position of a sample primary user, each of the multiple pieces of sample information including information of multiple sample secondary users and aggregate interference produced by the multiple sample secondary users to the sample primary user; and train a neural network model by using the information of the multiple sample secondary users as an input to the neural network model and using the aggregate interference produced by the multiple sample secondary users to the sample primary user as an output of the neural network model, to determine a parameter set of a neural network model corresponding to the position of the sample primary user.

According to another aspect of the present disclosure, a spectrum management system is provided. The spectrum management system includes one or more network side apparatuses for managing secondary users, one or more network side apparatuses for managing primary users and the spectrum management apparatus. The one or more network side apparatuses for managing secondary users are configured to send information of sample secondary users to a spectrum management apparatus. The one or more network side apparatuses for managing primary users are configured to send position information of a sample primary user to the spectrum management apparatus. The spectrum management apparatus is configured to: acquire multiple pieces of sample information with respect to a position of the sample primary user, each of the multiple of pieces of sample information including information of multiple sample secondary users and aggregate interference produced by the multiple sample secondary users to the sample primary user; and train a neural network model by using the information of the multiple sample secondary users as an input to the neural network model and using the aggregate interference produced by the multiple sample secondary users to the sample primary user as an output of the neural network model, to determine a parameter set of a neural network model corresponding to the position of the sample primary user.

According to another aspect of the present disclosure, a radio communication method performed by a spectrum management apparatus is provided. The radio communication method includes: acquiring multiple pieces of sample information with respect to a position of a sample primary user, each of the multiple pieces of sample information including information of multiple sample secondary users and aggregate interference produced by the multiple sample secondary users to the sample primary user; and training a neural network model by using the information of the multiple sample secondary users as an input to the neural network model and using the aggregate interference produced by the multiple sample secondary users to the sample primary user as an output of the neural network model, to determine a parameter set of a neural network model corresponding to the position of the sample primary user.

According to another aspect of the present disclosure, a computer readable storage medium is provided. The computer readable storage medium includes executable computer instructions that, when executed by a computer, cause the computer to implement the radio communication method according to the embodiment of the present disclosure.

With the spectrum management apparatus, the spectrum management system, the radio communication method and the computer readable storage medium according to the present disclosure, a neural network model can be trained by using multiple samples, to acquire a parameter set of the neural network model corresponding to a position of the primary user. In this way, the aggregate interference can be calculated by using the trained neural network model, such that a value of the aggregate interference can be accurately calculated based on an actual environmental condition and an actual distribution of users, thereby performing spectrum management reasonably.

Further application fields will become apparent from the descriptions herein. The description and specific examples in the summary are only illustrative and are not intended to limit the scope of the present disclosure.

BRIEF DESCRIPTION OF THE DRAWINGS

The drawings described herein are used for illustrating the preferred embodiments, rather than all of the possible embodiments, and are not intended to limit the scope of the present disclosure. In the drawings:

FIG. 3($b$) is a schematic diagram showing positions of a primary user and secondary users that may be used as samples according to another embodiment of the present disclosure;

Figure 1:
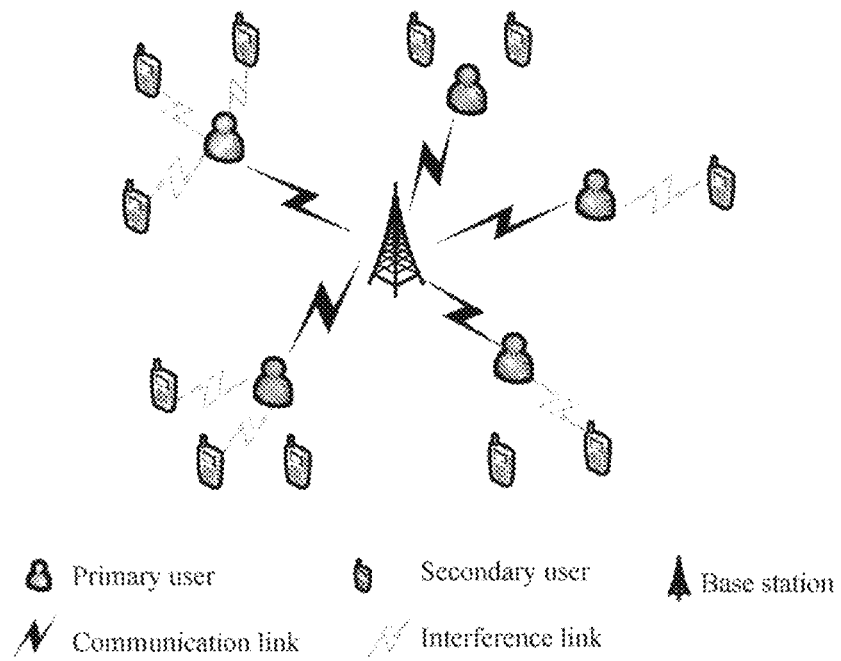
FIG. 1 is a schematic diagram of an application scenario according to an embodiment of the present disclosure.

Although the present disclosure is susceptible to various modifications and substitutions, specific embodiments thereof are shown in the drawings as an example and are described in detail herein. However, it should be understood that the description for specific embodiments herein is not intended to limit the present disclosure into a disclosed particular form, but rather, the present disclosure aims to cover all modifications, equivalents and substitutions within the spirit and scope of the present disclosure. It should be noted that, throughout the drawings, a numeral indicates a component corresponding to the numeral.

DETAILED DESCRIPTION OF EMBODIMENTS

Examples of the present disclosure are described now more fully with reference to the drawings. The following description is merely exemplary substantively and is not intended to limit the present disclosure and an application or use thereof.

Exemplary embodiments are provided below to make the present disclosure thorough and convey a scope of the present disclosure to those skilled in the art. Examples of various specific details, such as specific elements, apparatuses, and methods, are set forth to provide thorough understanding for the embodiments of the present disclosure. It is apparent to those skilled in the art that the exemplary embodiments may be embodied in multiple different forms without using specific details, and should not be construed as limiting the scope of the present disclosure. In some exemplary embodiments, well-known processes, well-known structures, and well-known technology are not described in detail.

The present disclosure will be described in the following order:

1. Description of a scenario
2. Configuration example of a spectrum management apparatus
 2.1 Configuration example of a training process
 2.2 Configuration example of a prediction process
3. Configuration example of a spectrum management system
4. Method embodiment
 4.1 Method embodiment of a training process;
 4.2 Method embodiment of a prediction process
5. Application example 1. Description of a Scenario FIG. 1 is a schematic diagram of an application scenario according to an embodiment of the present disclosure. As shown in FIG. 1, there are multiple primary user equipments within coverage of a network side apparatus such as a base station, and there may be one or more secondary user equipments around each primary user equipment. A communication between the base station and the primary user equipment may be performed by using an authorized spectrum, and the secondary user equipment may dynamically access the authorized spectrum based on certain rules. One or more secondary users may produce interference to a primary user when the primary user shares the same spectrum with the secondary users. A communication link between the base station and the primary user equipment is shown by a black solid link in FIG. 1, and a link between a secondary user equipment causing interference to the primary user equipment and the primary user equipment is shown by a white hollow link in FIG. 1, which is referred to as an interference link.

For such a scenario, a spectrum management apparatus in a radio communication system, a spectrum management system, a method performed by a spectrum management apparatus, and a computer readable storage medium are provided according to the present disclosure, to calculate a sum of interference, that is, aggregate interference, produced by one or more secondary users to a primary user based on an actual environmental condition and an actual distribution of users.

According to the present disclosure, the radio communication system may be a cognitive radio system, the spectrum management apparatus may be implemented by a SAS or a C×M, and the network side apparatus may be any type of base station apparatus such as an eNB and a gNB (a base station in a 5th generation communication system). In addition, the primary user equipment and the secondary user equipment according to the present disclosure may be mobile terminals or in-vehicle terminals.

2. Configuration Example of a Spectrum Management Apparatus

Figure 2:
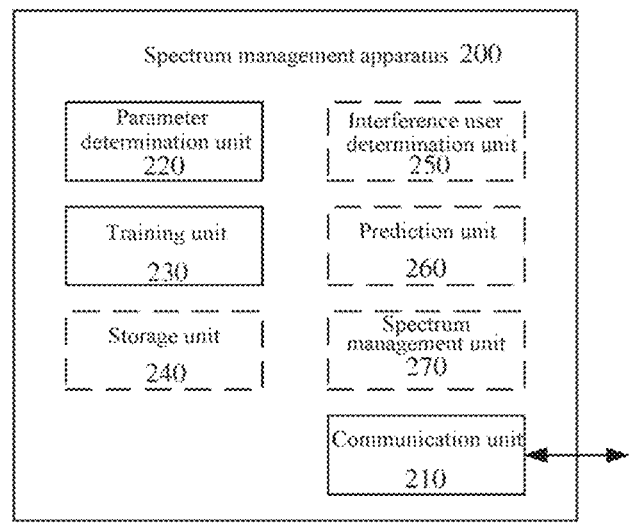
FIG. 2 is a block diagram showing a configuration example of a spectrum management apparatus according to an embodiment of the present disclosure.

FIG. 2 is a block diagram showing a configuration example of a spectrum management apparatus 200 according to an embodiment of the present disclosure. The spectrum management apparatus 200 herein may serve as a server in a radio communication system, such as a SAS or a C×M.

As shown in FIG. 2, the spectrum management apparatus 200 may include a communication unit 210, a parameter determination unit 220 and a training unit 230. In an embodiment, the spectrum management apparatus 200 may further include a storage unit 240, an interference user determination unit 250, a prediction unit 260 and a spectrum management unit 270.

Here, all units of the spectrum management apparatus 200 may be included in a processing circuitry. It should be noted that the spectrum management apparatus 200 may include one processing circuitry or multiple processing circuitries. Further, the processing circuitry may include various separated functional units to perform various different functions and/or operations. It should be noted that these functional units may be physical entities or logical entities, and units with different names may be implemented by the same physical entity.

According to embodiments of the present disclosure, the spectrum management apparatus 200 may train a neural network to acquire a parameter set of a neural network model corresponding to a position of the primary user in a process which is referred to as a training process below.

Further, the spectrum management apparatus 200 may further predict aggregate interference subjected by the primary user by using the neural network model corresponding to the position of the primary user in a process which is referred to as a prediction process below. A configuration example of the spectrum management apparatus 200 related to the training process and a configuration example of the spectrum management apparatus 200 related to the prediction process are described below.

<2.1 Configuration Example of a Training Process>

According to an embodiment of the present disclosure, the communication unit 210 may receive various pieces of information from another apparatus than the spectrum management apparatus 200 and transmit various pieces of information to another apparatus than the spectrum management apparatus 200. For example, the spectrum management apparatus 200 may acquire multiple pieces of sample information by the communication unit 210.

According to an embodiment of the present disclosure, each of multiple samples may include a sample primary user whose position is known and multiple sample secondary users whose positions are known, where the multiple sample secondary users are related to the position of the sample primary user. In addition, aggregate interference produced by the multiple sample secondary users to the sample primary user is known. Therefore, sample information acquired by the communication unit 210 may include: various pieces of information of the sample primary user, various pieces of information of the multiple sample secondary users related to the position of the sample primary user and the aggregate interference produced by the multiple sample secondary users to the sample primary user. According to embodiment of the present disclosure, the communication unit 210 may acquire above sample information with respect to each sample.

According to an embodiment of the present disclosure, the parameter determination unit 220 may determine, from various pieces of information acquired from the communication unit 210, information that may be used as an input to a neural network model and an output of the neural network model. Specifically, the parameter determination unit 220 may determine information of multiple sample secondary users in each sample as an input to a neural network and determine aggregate interference produced by the multiple sample secondary users in each sample to the sample primary user as an output of the neural network.

According to an embodiment of the present disclosure, the training unit 230 may train the neural network model based on the input to the neural network and the output of the neural network, where the input and the output are determined by the parameter determination unit 220. For example, the training unit 230 may train the neural network model by using the information of the multiple sample secondary users as the input to the neural network model and using the aggregate interference produced by the multiple sample secondary users to the sample primary user as the output of the neural network model, to determine a parameter set of the neural network model corresponding to the position of the sample primary user. That is, the training unit 230 may use the information of the multiple sample secondary users in each piece of sample information as an input and use the aggregate interference produced by the multiple sample secondary users to the sample primary user in each piece of sample information as an output, thereby training the neural network model based on multiple pieces of sample information.

According to an embodiment of the present disclosure, a parameter set of a neural network model determined through training the neural network model by the training unit 230 is associated with a position. Because multiple pieces of sample information used during training is related to the position of the sample primary user, the parameter set of the neural network model determined by training corresponds to the position of the sample primary user. In addition, the parameter set of the neural network model includes various parameters in the neural network model. That is, the neural network model can be determined uniquely when the parameter set of the neural network model is determined.

Thus, according to an embodiment of the present disclosure, the spectrum management apparatus 200 may acquire a parameter set of a neural network model corresponding to the position of the sample primary user by training the neural network model. In this way, aggregate interference can be calculated by using the trained neural network model, such that a value of the aggregate interference can be accurately calculated based on an actual environmental condition and an actual distribution of users, thereby performing spectrum management reasonably.

According to an embodiment of the present disclosure, multiple pieces of sample information are acquired with respect to the position of the sample primary user. Here, each sample may include a sample primary user whose position is known and multiple sample secondary users whose positions are known, where the multiple sample secondary users are related to the position of the sample primary user. In addition, aggregate interference produced by the multiple sample secondary users to the sample primary user is known. That is, positions of sample primary users in the multiple samples are the same.

According to an embodiment of the present disclosure, the sample primary user and the sample secondary users included in a sample may be determined based on historical information of a system where the spectrum management apparatus is located. That is, the sample primary user may be a primary user that once existed in history and the sample secondary users may be secondary users that once existed in history. Therefore, the aggregate interference produced by the multiple sample secondary users to the sample primary user may be determined based on the historical information.

According to an embodiment of the present disclosure, the spectrum management apparatus 200 may acquire, via the communication unit 210, historical existence information of a primary user (for example, historical operation state information of the primary user) from Environmental Sensing Capability (ESC) or Citizens Broadband Radio Service Devices (CBSD) with sensing capability, thereby determining a primary user that once existed in history as the sample primary user. Here, the ESC or the CBSD with sensing capability may be located near the sample primary user.

Thus, according to an embodiment of the present disclosure, a sample may be determined based on the primary user that once existed in history and the secondary users that once existed in history. That is, these users are once existed in history, and the aggregate interference produced by the multiple sample secondary users to the sample primary user is an actual interference value obtained based on an actual environment and an actual distribution in history. Therefore, by training a neural network model using the sample, the obtained neural network model can predict a value of the aggregate interference based on the actual environmental condition and distribution of users, such that the predicted value of the aggregate interference is accurate.

Figure 3:
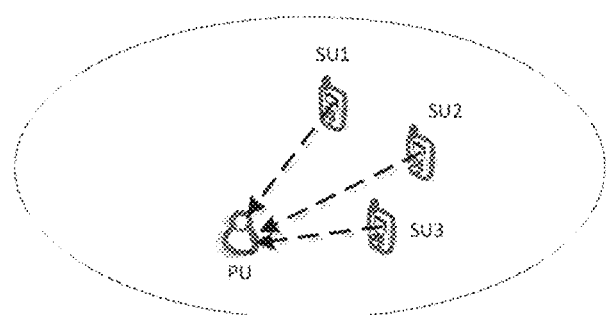
FIG. 3($a$) is a schematic diagram showing positions of a primary user and secondary users that may be used as samples according to an embodiment of the present disclosure.
Figure 3:
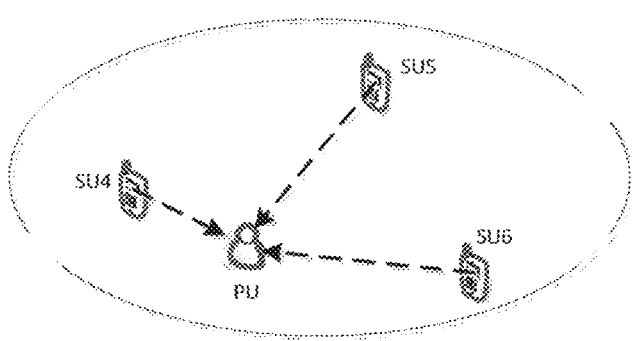

FIG. 3(*a*) and FIG. 3(*b*) are schematic diagrams showing positions of primary users and secondary users that can be used as samples according to embodiments of the present disclosure. As shown in FIG. 3(*a*) and FIG. 3(*b*), in the two samples, the sample primary users (PU) has the same position, and the multiple sample secondary users (SU) have different positions. In FIG. 3(*a*), the sample includes one sample primary user PU and three sample secondary users SU1, SU2 and SU3. In addition, a position of the sample primary user PU, positions of the three sample secondary users SU1, SU2 and SU3 and a value of aggregate interference produced by the three sample secondary users SU1, SU2 and SU3 to the sample primary user PU are all known. In FIG. 3(*b*), the sample includes one sample primary user PU and three sample secondary users SU4, SU5 and SU6. In addition, a position of the sample primary user PU, positions of the three sample secondary users SU4, SU4 and SU6 and a value of aggregate interference produced by the three sample secondary users SU4, SU5 and SU6 to the sample primary user PU are all known. FIG. 3(*a*) and FIG. 3(*b*) only show two examples that may be taken as samples. The primary user PU in FIG. 3(*a*) and the primary user PU in FIG. 3(*b*) may be the same primary user or different primary users located in the same position. Similarly, any one of the three sample secondary users SU1, SU2 and SU3 shown in FIG. 3(*a*) and any one of the three sample secondary users SU4, SU5 and SU6 shown in FIG. 3(*b*) may be the same sample secondary user. In addition, the number of the multiple sample secondary users may not be three. As described above, the sample primary user may be a primary user that once existed in history and the sample secondary users may be secondary users that once existed in history. Therefore, for example, in FIG. 3(*a*), the sample primary user PU may be a primary user that once existed in history and the three sample secondary users SU1, SU2 and SU3 may be secondary users that once existed in history. That is, there is a distribution as shown in FIG. 3(*a*) at a time instant before the current time instant, where the three secondary users SU1, SU2 and SU3 produce interference to the primary user PU and aggregate interference is known.

According to an embodiment of the present disclosure, as shown in FIG. 2, the spectrum management apparatus 200 may further include an interference user determination unit 250 configured to determine secondary users producing interference to the primary user. For example, the interference user determination unit 250 may determine sample secondary users producing interference to the sample primary user at least according to a user type and an interference threshold of the sample primary user. Here, users may be classified based on a demand on interference to determine the user type. The user type includes, but is not limited to, a radar, a satellite earth station, a (point-to-point or point-to-multipoint) broadband radio communication system, a broadcast television system and the like. Specific demands on interference are different for different types of users. In addition, the interference threshold represents a threshold of interference subjected by the primary user. Therefore, according to an embodiment of the present disclosure, the secondary users producing interference to the primary user can be determined at least based on the user type and the interference threshold. In addition, the interference user determination unit 250 may further determine an interference range of the sample secondary users based on other information such as power information of the sample secondary users, thereby determining whether the sample secondary users produce interference to the sample primary user. Further, the spectrum management apparatus 200 may determine the multiple sample secondary users producing interference to the sample primary user as multiple sample secondary users included in the sample. That is, the sample may include a sample primary user and multiple sample secondary users producing interference to the sample primary user.

According to an embodiment of the present disclosure, the spectrum management apparatus 200 may acquire, via the communication unit 210, information of the primary user from a database. The information of the primary user includes the user type and the interference threshold of the primary user. The database may be accessed by a SAS such as a database of a radio management organization (for example, American Federal Communications Commission FCC). Therefore, in a case that the spectrum management apparatus 200 is implemented by the SAS, the spectrum management apparatus 200 may acquire the information of the primary user by accessing a database; and in a case that the spectrum management apparatus 200 is implemented by the C×M, the SAS may acquire the information of the primary user by accessing a database and send the information of the primary user to the spectrum management apparatus 200. In general, the spectrum management apparatus 200 may acquire the information of the sample primary user that includes the information of the sample primary user includes the user type and the interference threshold of the sample primary user, and determine the multiple sample secondary users producing interference to the sample primary user based on the information of the sample primary user.

According to an embodiment of the present disclosure, information of multiple sample secondary users may include information related to a position of each sample secondary user in the multiple sample secondary users.

According to an embodiment of the present disclosure, the information of the multiple sample secondary users may include position information of each sample secondary user in the multiple sample secondary users. That is, the position information of each sample secondary user in the multiple sample secondary users may be used as an input to the neural network.

According to an embodiment of the present disclosure, position information of a sample secondary user may be represented by an absolute position of the sample secondary user or a relative position between the sample secondary user and a reference position. Here, the reference position includes, but is not limited to, the position of the sample primary user, a position of a certain sample secondary user, a position of the spectrum management apparatus 200 and the like. In addition, exemplary, the position information may be represented in a form of a polar coordinate. That is, the position information of the sample secondary user may include information of a distance between the sample secondary user and the reference position and information of an angle between the sample secondary user and the reference position. Here, the position of the sample primary user or a position of a selected reference point (for example, a sample secondary user close to the sample primary user or the spectrum management apparatus 200) may be used as an origin of the polar coordinate, which is not limited in the present disclosure.

Thus, according to an embodiment of the present disclosure, the position information of the sample secondary user may be represented in multiple ways. In a case that the position information of the sample secondary user is represented in a form of a polar coordinate, the neural network model is trained by the spectrum management apparatus 200 accurately, such that the value of the aggregate interference is predicted accurately.

As described above, the spectrum management apparatus 200 may acquire, via the communication unit 210, the information of the primary user from a database. Here, the acquired information of the primary user may further include the position of the sample primary user. In addition, the spectrum management apparatus 200 may acquire, via the communication unit 210, the information of the secondary users from CBSD for managing secondary users. For example, the spectrum management apparatus 200 may acquire positions of secondary users around the sample primary user from the CBSD.

According to an embodiment of the present disclosure, in a case that the spectrum management apparatus 200 acquires, as described above, the position of the sample primary user and the positions of the secondary users around the sample primary user, the interference user determination unit 250 may determine secondary users producing interference to the sample primary user and taken these secondary users as sample secondary users. Further, the parameter determination unit 220 may determine, based on positions of the sample secondary users (in an embodiment, based on the position of the sample primary user and the positions of the sample secondary users in a case that the position information of the sample secondary users is represented by a relative position between the sample secondary users and the sample primary user), information of sample secondary users that is used as an input to the neural network model.

According to an embodiment of the present disclosure, the information of the multiple sample secondary users further includes one or more of: information related to a radio propagation environment between each sample secondary user and the sample primary user, power information of each sample secondary user and antenna radiation direction information of each sample secondary user. That is, the spectrum management apparatus 200 may use one or more pieces of above information as an input to the neural network. According to an embodiment of the present disclosure, the information related to the radio propagation environment between each sample secondary user and the sample primary user includes, but is not limited to, path loss information between the sample primary user and the sample secondary users.

As described above, the spectrum management apparatus 200 may acquire, via the communication unit 210, the information of the secondary users from the CBSD for managing secondary users. For example, the spectrum management apparatus 200 may acquire above information of the sample secondary users from the CBSD for managing sample secondary users.

According to an embodiment of the present disclosure, if multiple pieces of information are used as an input to the neural network model, large calculation amount and time period are required in training the neural network model, and the trained neural network model is accurate. Therefore, the spectrum management apparatus 200 may select information as an input to the neural network model based on an actual demand.

Moreover, according to an embodiment of the present disclosure, the spectrum management apparatus 200 may determine a node number of an input layer of a neural network model required to be trained based on the number of pieces of input information of the neural network model and the number of sample secondary users. For example, in a case that only position information of multiple sample secondary users is used as an input to the neural network model and the position information of the multiple sample secondary users is represented by a polar coordinate, because the polar coordinate includes distance information and angle information, the node number with respect to each sample secondary user is 2. The node number of the input layer of the neural network model is 6 in a case that there are three sample secondary users. Further, a large number of pieces of input information of the neural network model or a large number of sample secondary users corresponds to a large node number of the input layer of the neural network model.

According to an embodiment of the present disclosure, in order to avoid large calculation amount caused by a large node number of the input layer of the neural network model, the parameter determination unit 220 may divide the multiple sample secondary users into multiple clusters, and information of the multiple sample secondary users may include: position information of a cluster center of each cluster of the multiple clusters. That is, the position information of a cluster center of each cluster is used as an input to the neural network model.

According to an embodiment of the present disclosure, in a case that the number of sample secondary users is greater than a threshold M of the number of secondary users, the parameter determination unit 220 may perform a clustering operation; and in a case that the number of the sample secondary users is smaller than or equal to the threshold M of the number of secondary users, the parameter determination unit 220 may not perform the clustering operation, and use the position information of each sample secondary user as an input to the neural network model as described above.

According to an embodiment of the present disclosure, the parameter determination unit 220 may divide the multiple sample secondary users into multiple clusters based on a position of each sample secondary user, such that sample secondary users close to each other are located in the same cluster. A method for dividing the multiple sample secondary users into multiple clusters is not limited in the present disclosure, which includes, but is not limited to, a clustering algorithm based on Euclidean distance.

According to an embodiment of the present disclosure, the parameter determination unit 220 may determine the number of the clusters as the threshold M of the number of secondary users. That is, in a case that the number of the sample secondary users is greater than the threshold M of the number of secondary users, the parameter determination unit 220 may perform the clustering operation to divide the secondary users into M clusters. However, this is not limited, and the parameter determination unit 220 may further determine the number of clusters based on the number of secondary users.

According to an embodiment of the present disclosure, position information of a cluster center may be represented in a way similar to the way in which the position information of the sample secondary users is represented. For example, the position information of the cluster center may be represented by an absolute position of the cluster center or a relative position between the cluster center and a reference position. Here, the reference position includes, but is not limited to, the position of the sample primary user, a position of a certain cluster center, a position of a certain sample secondary user, the position of the spectrum management apparatus 200 and the like. In addition, exemplary, the position information may be represented in a form of a polar coordinate. That is, the position information of the cluster center may include information of a distance between the cluster center and the reference position and information of an angle between the cluster center and the reference position. Here, the position of the sample primary user or a position of a selected reference point (for example, a sample secondary user close to the sample primary user, a cluster center close to the sample primary user or the spectrum management apparatus 200) may be used as an origin of the polar coordinate, which is not limited in the present disclosure.

According to an embodiment of the present disclosure, the information of the multiple sample secondary users may further include one or more of: information related to a radio propagation environment between the cluster center of each cluster and the sample primary user, and a superposition value of power of all sample secondary users in each cluster. That is, the parameter determination unit 220 may further use one or more pieces of above information as an input to the neural network. According to an embodiment of the present disclosure, the information related to the radio propagation environment between the sample primary user and the cluster center includes, but is not limited to, path loss information between the sample primary user and the cluster center. The superposition value of power of all sample secondary users in each cluster may be a scalar superposition value or a vector superposition value of power of all sample secondary users.

According to an embodiment of the present disclosure, the spectrum management apparatus 200 may determine a node number of an input layer of a neural network model to be trained based on the number of pieces of input information to the neural network model and the number of cluster centers. Further, a large number of pieces of input information to the neural network model or a large number of the cluster centers corresponds to a large node number of the input layer of the neural network model.

As described above, according to an embodiment of the present disclosure, in a case that the number of the sample secondary users is large, the spectrum management apparatus 200 may divide the sample secondary users into multiple clusters, such that information of the sample secondary users is replaced by information of the cluster centers, thereby reducing the node number of the input layer of the neural network model, reducing a calculation amount and saving computing time.

As described above, the parameter determination unit 220 may determine information as an input to the neural network model and determine, based on the number of pieces of information as an input to the neural network model and the number of the sample secondary users (or the number of the clusters), the node number of the input layer of the neural network model. Further, the parameter determination unit 220 may further determine information as an output of the neural network model.

According to an embodiment of the present disclosure, the spectrum management apparatus 200 may acquire, via the communication unit 210, aggregate interference produced by multiple sample secondary users to a primary user from a network side apparatus for managing primary user and use the aggregate interference produced by the multiple sample secondary users to the primary user as an output of the neural network model. Here, the network side apparatus for managing primary user includes, but is not limited to, the ESC or the CBSD with sensing capability.

According to an embodiment of the present disclosure, the training unit 230 may input the above determined input information to the neural network model to the neural network model and calculate an error of the neural network model by using the above determined output information of the neural network model as an output truth value, such that each weight of the neural network model is adjusted continually, thereby achieving training.

Figure 4:
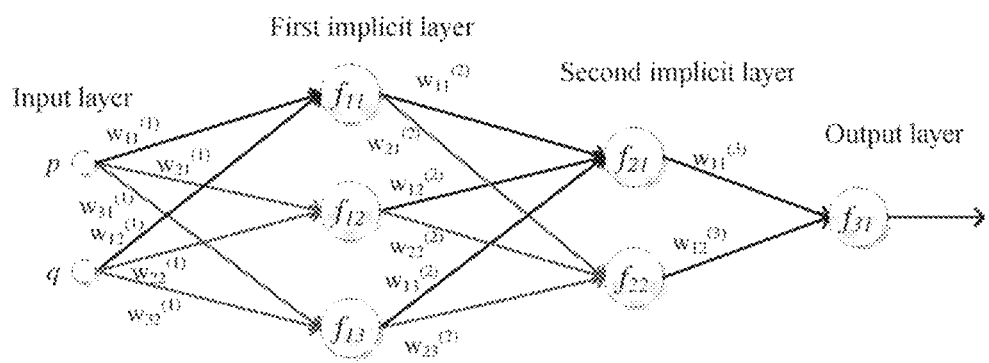
FIG. 4 is a schematic diagram showing a structure of a neural network according to an embodiment of the present disclosure.

FIG. 4 is a schematic diagram showing a structure of a neural network model according to an embodiment of the present disclosure. A neural network model includes an input layer, one or more implicit layers and an output layer. Further, each layer includes one or more nodes. Any two nodes respectively located in two adjacent layers are connected to each other via a path with a weight. As shown in FIG. 4, the neural network model includes one input layer, two implicit layers (a first implicit layer and a second implicit layer) and one output layer. The input layer includes two nodes p and q; the first implicit layer includes three nodes respectively with activation functions $f_{11}$, $f_{12}$, and $f_{13}$; the second implicit layer includes two nodes respectively with activation functions $f_{21}$ and $f_{22}$; the output layer includes one node with an activation function $f_{31}$. Further, in FIG. 4, a weight of a path between the jth node in the (k−1)th layer and the ith node in the kth layer is expressed by $w_{ij}^{(k)}$, where k is a positive integer and the 0th layer serves as the input layer. As shown in FIG. 4, an output $y_{11}$ of the first node in the first layer may be calculated according to the following equation:

$$y_{11} = f_{11}(w_{11}^{(1)} * p + w_{12}^{(1)} * q)$$

An output $y_{12}$ of the second node in the first layer and an output $y_{13}$ of the third node in the first layer may be calculated according to similar equations. Further, an output $y_{21}$ of the first node in the second layer may be calculated according to the following equation:

$$y_{21} = f_{21}(w_{11}^{(2)} * y_{11} + w_{12}^{(2)} * y_{12} + w_{13}^{(2)} * y_{13})$$

Similarly, an output $y_{22}$ of the second node in the second layer may be calculated according to a similar equation. Further, an output of the first node in the third layer, that is, an output $y_{31}$ of the output layer, may be calculated according to the following equation:

$$y_{31} = f_{31}(w_{11}^{(3)} * y_{21} + w_{12}^{(3)} * y_{22})$$

According to an embodiment of the present disclosure, the value of the aggregate interference may be predicted by using a machine learning model such as a Neural Network (NN). For example, a Convolution Neural Network (CNN), a Recurrent Neural Network (RNN) model, a Back-Propagation (BP) Neural Network, a Generative Adversarial Network (GAN), a Bayes Classifier and other models may be used. In addition, a supervised learning model and an unsupervised learning model may be used.

Figure 5:
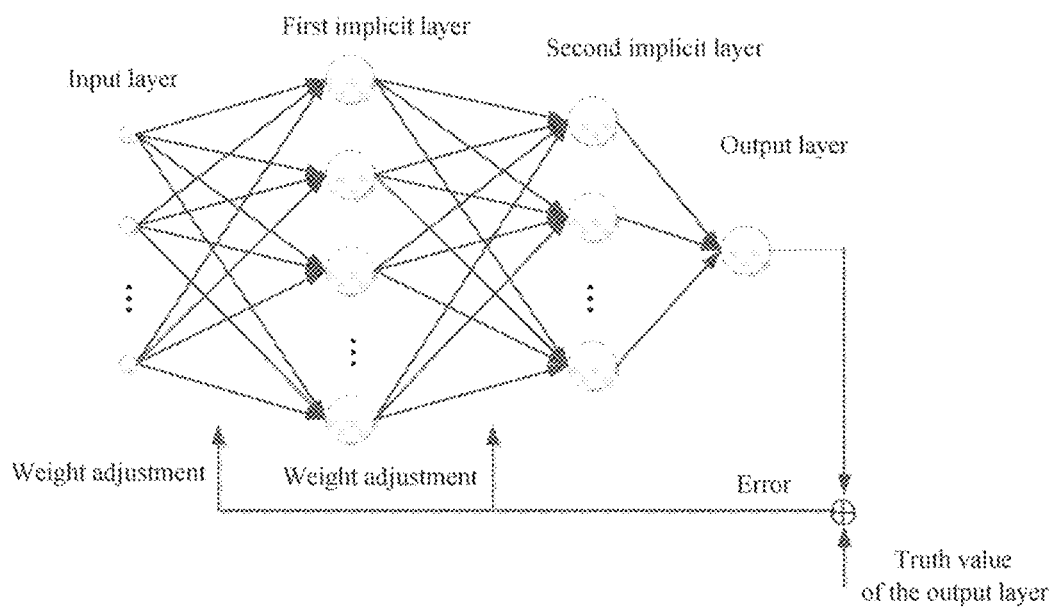
FIG. 5 is a schematic diagram showing a principle of a Back-Propagation (BP) neural network according to an embodiment of the present disclosure.

FIG. 5 is a schematic diagram showing a principle of a Back-Propagation (BP) neural network model according to an embodiment of the present disclosure. As shown in FIG. 5, input information of the neural network model is inputted via the input layer, and is transmitted passing through each implicit layer and the output layer, to obtain output information. An error is obtained by comparing the output information of the neural network model with a truth value of the output layer, thereby performing back-adjustment on each weight of the neural network model.

Figure 6:
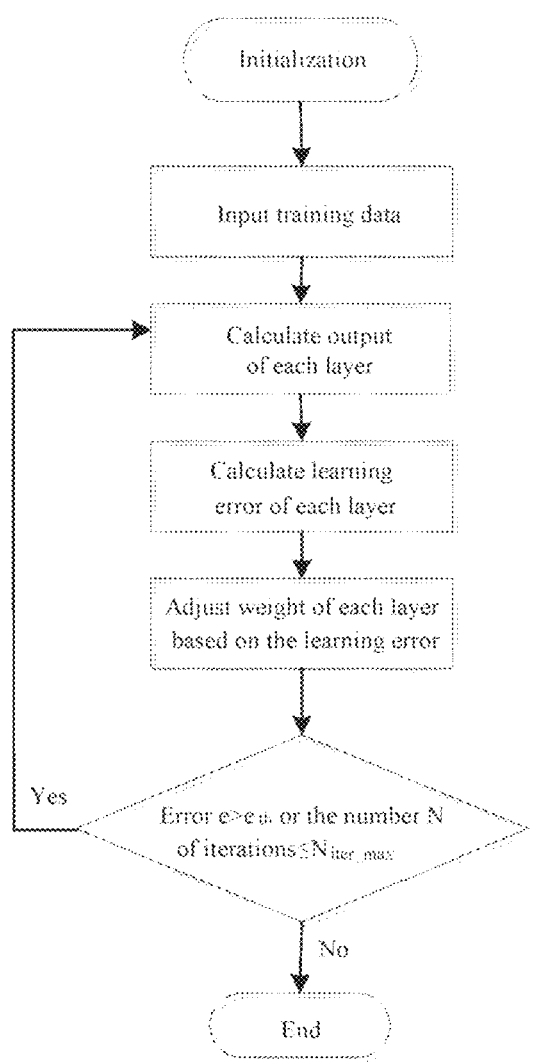
FIG. 6 is a flowchart of an algorithm of the Back-Propagation neural network according to an embodiment of the present disclosure.

FIG. 6 is a flowchart of an algorithm of the Back-Propagation neural network model according to an embodiment of the present disclosure. As shown in FIG. 6, after an initialization, training data is inputted and output of each layer is calculated layer by layer until output of the output layer is calculated. Next, a learning error of each layer is calculated layer by layer based on the error between the truth value of the output layer and the output of the output layer, and a weight of each layer is adjusted based on the learning error. In a case that the error e is greater than an error threshold $e_{th}$ or the number N of iterations is smaller than or equal to a number threshold $N_{iter\_max}$, the process returns to the step of calculating an output of each layer. That is, a train process on a neural network model is an iterative process, and the process is repeated until the error e is smaller than or equal to the error threshold $e_{th}$ and the number N of iterations is greater than the number threshold $N_{iter\_max}$.

As described above, the training process according to the present disclosure is described with reference to FIG. 5 and FIG. 6 for a Back-Propagation neural network model. Those skilled in the art should understand that a training process for another type of neural network model is similar to the training process for the Back-Propagation neural network model.

According to an embodiment of the present disclosure, a parameter set of a neural network model corresponding to the position of the sample primary user that is obtained by training the neural network model may include: node numbers of the input layer, the output layer and the implicit layers of the neural network model and weight coefficient information of the neural network model. Here, the weight coefficient information may include weight coefficient of each path in the neural network model. As can be seen from FIG. 4 to FIG. 6, a structure of a neural network model is determined based on the above parameters, such that the neural network model can be determined uniquely based on the parameter set of the neural network model.

As described above, the training unit 230 may train a neural network model to obtain a parameter set of the neural network model corresponding to the position of the sample primary user.

According to an embodiment of the present disclosure, the spectrum management apparatus 200 may further send, via the communication unit 210, the parameter set of the neural network model corresponding to the position of the sample primary user to another spectrum management apparatus than the spectrum management apparatus 200, for the another spectrum management apparatus to predict, using the neural network model, aggregate interference produced at the position of the sample primary user.

That is, the spectrum management apparatus 200 may send, after determining the parameter set of the neural network model corresponding to the position of the sample primary user, the parameter set to another spectrum management apparatus. In this way, the another spectrum management apparatus may directly use the parameter set of the neural network model determined by the spectrum management apparatus 200 to predict aggregate interference produced at the same position without having to train the neural network again.

Similarly, the spectrum management apparatus 200 may further receive a parameter set of a neural network model corresponding to the position of the sample primary user from the another spectrum management apparatus. If the spectrum management apparatus 200 receives a parameter set of a neural network model corresponding to the position of the sample primary user from another spectrum management apparatus, the spectrum management apparatus 200 may not perform above training process and directly use the parameter set of the neural network model obtained from the another spectrum management apparatus.

Thus, according to an embodiment of the present disclosure, a parameter set of a neural network model may be transferred between spectrum management apparatuses. That is, for the same position, as long as any one spectrum management apparatus determines a parameter set of a neural network model with respect to the position, it is unnecessary for another spectrum management apparatus to train a neural network with respect to the position again, and the another spectrum management apparatus can directly use the trained neural network model, thereby saving overhead and calculation amount and avoiding repeated trainings.

According to an embodiment of the present disclosure, as shown in FIG. 2, the spectrum management apparatus 200 may further include the storage unit 240. The storage unit 240 is configured to store a parameter set of a neural network model corresponding to a position of the sample primary user. Here, the parameter set of a neural network model corresponding to a position of the sample primary user may be a parameter set of a neural network model obtained through training by the training unit 230 of the spectrum management apparatus 200 or a parameter set of a neural network model acquired from another spectrum management apparatus.

According to an embodiment of the present disclosure, a parameter set of a neural network model is associated with a position. For example, the storage unit 240 may store a parameter set of a neural network model in a form as shown in the following table.

TABLE 1

| Position | Parameter Set of Neural Network Model |
|---|---|
| Position 1 | Parameter set 1 |
| Position 2 | Parameter set 2 |
| ... | ... |
| Position n | Parameter set n |

Apparently, the above storage form is a non-limiting example. The storage unit 240 may also store a parameter set of a neural network model corresponding to a position of the sample primary user in another form. The parameter sets are only related to positions, and are not related to the sample primary user. That is, in a case that the spectrum management apparatus 200 determines, with respect to a sample primary user, a parameter set of a neural network model corresponding to a position of the sample primary user, it is only required to store the position (for example, coordinates) of the sample primary user and the parameter set in the storage unit 240 and/or send the position (for example, coordinates) of the sample primary user and the parameter set to another spectrum management apparatus.

Figure 7:
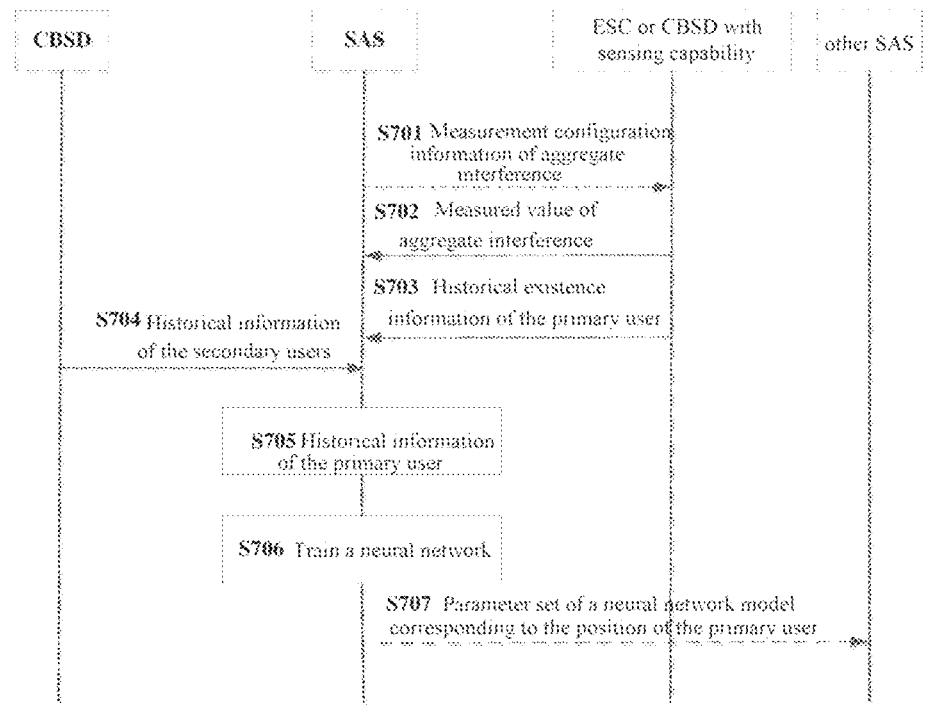
FIG. 7 shows a signaling flowchart of performing a training process by a spectrum access system (SAS) according to an embodiment of the present disclosure.

FIG. 7 shows a signaling flowchart of a training process performed by the SAS according to an embodiment of the present disclosure. As shown in FIG. 7, the SAS may be implemented by the spectrum management apparatus 200 according to the present disclosure. The CBSD may be an apparatus for managing secondary users, and the ESC or the CBSD with sensing capability may be an apparatus for managing primary users. In a case that the SAS acquire a measured value of aggregate interference from the ESC, in step S702, the SAS directly acquire the measured value of aggregate interference from the ESC, that is, aggregate interference produced by multiple sample secondary users to the sample primary user. In a case that the SAS acquires the measured value of aggregate interference from the CBSD with sensing capability, the SAS sends measurement configuration information of aggregate interference to the CBSD with sensing capability in step S701 and acquire the measured value of the aggregate interference from the CBSD with sensing capability in step S702. Next, in step S703, the SAS acquires historical existence information of the primary user, such as historical operation state information of the primary user, from the ESC or the CBSD with sensing capability. Next, in step S704, the SAS acquires historical information of the secondary users from the CBSD, where the historical information of the secondary users may include information related to positions of the secondary users, power of the secondary users, radio propagation environment between each secondary user and the primary user and the like. Next, in step S705, the SAS may acquire historical information of the primary user by accessing a database, where the historical information of the primary user may include a position of the primary user, the user type and the interference threshold of the primary user and the like. Next, in step S706, the SAS may determine multiple pieces of sample information from all acquired information and train a neural network model based on the multiple pieces of sample information, to determine a parameter set of the neural network model corresponding to the position of the sample primary user, where each piece of sample information includes information of a primary user that once existed in history, multiple secondary users that once existed in history and produced interference to the primary user that once existed in history, and a value of aggregate interference produced by the multiple secondary users to the primary user. Next, in step S707, in an embodiment, the SAS may send the determined parameter set to another SAS.

Figure 8:
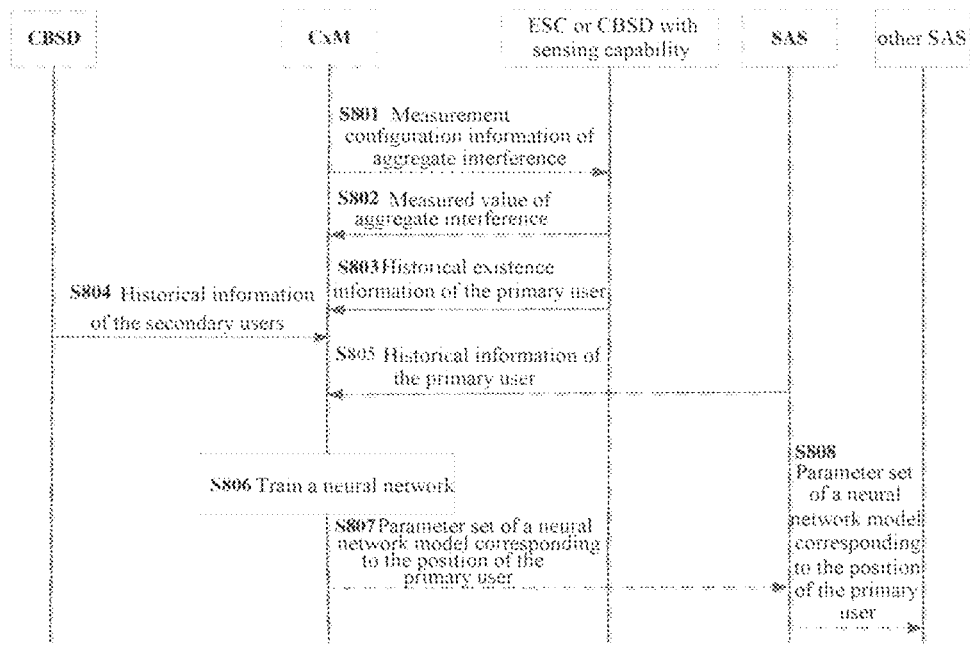
FIG. 8 shows a signaling flowchart of performing a training process by a coexistence manager (CxM) according to an embodiment of the present disclosure.

FIG. 8 shows a signaling flowchart of a training process performed by the C×M according to an embodiment of the present disclosure. As shown in FIG. 8, the C×M may be implemented by the spectrum management apparatus 200 according to the present disclosure. The CBSD may be an apparatus for managing secondary users, and the ESC or the CBSD with sensing capability may be an apparatus for managing primary users. In a case that the C×M acquires a measured value of aggregate interference from the ESC, in step S802, the C×M directly acquires the measured value of aggregate interference from the ESC, that is, aggregate interference produced by multiple sample secondary users to the sample primary user. In a case that the C×M acquires the measured value of aggregate interference from the CBSD with sensing capability, the SAS sends measurement configuration information of aggregate interference to the CBSD with sensing capability in step S801 and acquires the measured value of the aggregate interference from the CBSD with sensing capability in step S802. Next, in step S803, the C×M acquires historical existence information of the primary user, such as historical operation state information of the primary user, from the ESC or the CBSD with sensing capability. Next, in step S804, the C×M acquires historical information of the secondary users from the CBSD, where the historical information of the secondary users may include information related to positions of the secondary users, power of the secondary users, radio propagation environment between each secondary user and the primary user. Next, in step S805, the C×M may acquire historical information of the primary user from the SAS, where the historical information of the primary user may include information of a position of the primary user, a user type and an interference threshold of the primary user and the like. Next, in step S806, the C×M may determine multiple pieces of sample information from all acquired information and train a neural network based on the multiple pieces of sample information to determine a parameter set of a neural network model corresponding to the position of the sample primary user, where each piece of sample information includes information of a primary user that once existed in history, multiple secondary users that once existed in history and produced interference to the primary user that once existed in history and a value of aggregate interference produced by the multiple secondary users to the primary user. Next, in step S807, in an embodiment, the C×M may send the determined parameter set to the SAS. Next, in step S808, in an embodiment, the SAS may send the determined parameter set to another SAS.

As described above, with the spectrum management apparatus 200 according to the embodiments of the present disclosure, multiple pieces of sample information may be acquired with respect to a position of a sample primary user, such that a neural network model is trained based on the multiple pieces of sample information, thereby determining a parameter set of a neural network model corresponding to the position of the sample primary user. In this way, the neural network model can be trained according to an actual environmental condition and an actual distribution of users, such that the aggregate interference is predicted accurately. Further, the spectrum management apparatus 200 may further send the determined parameter set of the neural network model to another spectrum management apparatus. Therefore, it is unnecessary for the another spectrum management apparatus to train the neural network model again, and the another spectrum management apparatus can predict the aggregate interference by using the trained neural network model directly, thereby reducing overhead and avoiding repeated trainings.

<2.2 Configuration Example of a Prediction Process>

According to an embodiment of the present disclosure, the communication unit 210 may be configured to acquire information of multiple current secondary users with respect to a position of a current primary user.

According to an embodiment of the present disclosure, the spectrum management apparatus 200 may further include the prediction unit 260, and the prediction unit 260 is configured to acquire a parameter set of a neural network model corresponding to the position of the current primary user.

According to an embodiment of the present disclosure, the prediction unit 260 may be further configured to predict aggregate interference produced by the multiple current secondary users to the current primary user, by using the information of the multiple current secondary users as an input to the neural network model corresponding to the position of the current primary user.

Thus, according to an embodiment of the present disclosure, the spectrum management apparatus 200 may predict the aggregate interference subjected by the current primary user by using a neural network model, such that a value of the aggregate interference can be accurately predicted based on an actual environmental condition and an actual distribution of users, thereby performing spectrum management reasonably.

According to an embodiment of the present disclosure, the parameter set of a neural network model corresponding to the position of the current primary user acquired by the prediction unit 260 may be obtained from the spectrum management apparatus 200 or another spectrum management apparatus than the spectrum management apparatus 200.

According to an embodiment of the present disclosure, the prediction unit 260 may determine, based on the position of the current primary user, whether the storage unit 240 stores the parameter set of a neural network model corresponding to the position of the current primary user. Here, if the spectrum management apparatus 200 has trained the neural network model with respect to the position of the current primary user and obtained the parameter set of a neural network model corresponding to the position of the current primary user, the spectrum management apparatus 200 may store the obtained parameter set in the storage unit 240. If another spectrum management apparatus 200 has trained the neural network model with respect to the position of the current primary user and obtained the parameter set of a neural network model corresponding to the position of the current primary user, the another spectrum management apparatus may send the obtained parameter set to the spectrum management apparatus 200, such that the obtained parameter set is stored in the storage unit 240 of the spectrum management apparatus 200. That is, the prediction unit 260 may determine whether there is a spectrum management apparatus that has trained a neural network model with respect to the position of the current primary user.

According to an embodiment of the present disclosure, in a case that the prediction unit 260 determines that the storage unit 240 has stored the parameter set of a neural network model corresponding to the position of the current primary user, the prediction unit 260 may predict the aggregate interference subjected by the current primary user by using the trained neural network model directly.

According to an embodiment of the present disclosure, in a case that the prediction unit 260 determines that the storage unit 240 has not stored the parameter set of a neural network model corresponding to the position of the current primary user, the spectrum management apparatus 200 may perform the training process according to an embodiment of the present disclosure. That is, the spectrum management apparatus 200 acquires multiple pieces of sample information by using the position of the current primary user as a position of a sample primary user, and train a neural network model by using the information of the multiple sample secondary users as an input to the neural network model and using the aggregate interference produced by the multiple sample secondary users to the sample primary user as an output of the neural network model, to determine a parameter set of the neural network model corresponding to the position of the sample primary user, where each of the multiple pieces of sample information includes information of multiple sample secondary users and aggregate interference produced by the multiple sample secondary users to the sample primary user.

Here, the training process may be performed according to any one of above-described embodiments of the present disclosure, which is not repeated herein. It should be noted that the position of the sample primary user during the training process is the same as the position of the current primary user during the prediction process. That is, multiple samples are determined based on the position of the current primary user, and in each sample, the position of the sample primary user is the same as the position of the current primary user.

According to an embodiment of the present disclosure, the interference user determination unit 250 may determine current secondary users producing interference to the current primary user. Specifically, the interference user determination unit 250 may determine, based on a user type and an interference threshold of the current primary user, current secondary users producing interference to the current primary user. Similarly, the spectrum management apparatus 200 may determine the multiple current secondary users producing interference to the current primary user as multiple secondary users that are to be determined as an input to the neural network model.

According to an embodiment of the present disclosure, information of multiple current secondary users may include information related to a position of each current secondary user in the multiple current secondary users.

According to an embodiment of the present disclosure, information of multiple current secondary users may include position information of each current secondary user of the multiple current secondary users. That is, the position information of each current secondary user of the multiple current secondary users may be used as an input to the neural network model.

Similarly, position information of a current secondary user may be represented by an absolute position of the current secondary user or a relative position between the current secondary user and a reference position. Here, the reference position includes, but is not limited to, the position of the current primary user, a position of a certain current secondary user, the position of the spectrum management apparatus 200 and the like. In addition, exemplary, the position information may be represented in a form of a polar coordinate. That is, the position information of the current secondary user may include information of a distance between the current secondary user and the reference position and information of an angle between the current secondary user and the reference position. Here, the position of the current primary user or a position of a selected reference point (for example, a current secondary user close to the current primary user or the spectrum management apparatus 200) may be used as an origin of the polar coordinate, which is not limited in the present disclosure.

According to an embodiment of the present disclosure, the spectrum management apparatus 200 may acquire, via the communication unit 210, the information of the current primary user from a database. Here, the acquired information of the current primary user includes one or more of: the user type of the current primary user, the interference threshold of the current primary user and the position of the current primary user. In addition, the spectrum management apparatus 200 may further acquire, via the communication unit 210, the information of the secondary users from the CBSD for managing secondary users. For example, the spectrum management apparatus 200 may acquire positions of current secondary users around the current primary user from the CBSD.

According to an embodiment of the present disclosure, in a case that the spectrum management apparatus 200 acquires, as described above, the position of the current primary user and the positions of the current secondary users around the current primary user, the interference user determination unit 250 may determine current secondary users producing interference to the current primary user and use information of these current secondary users as an input to the neural network model.

According to an embodiment of the present disclosure, the information of the multiple current secondary users may further include one or more of: information related to a radio propagation environment between each current secondary user and the current primary user, power information of each current secondary user and antenna radiation direction information of each current secondary user. According to an embodiment of the present disclosure, the information related to the radio propagation environment between each current secondary user and the current primary user includes, but is not limited to, path loss information between the current primary user and the current secondary users.

As described above, the spectrum management apparatus 200 may acquire, via the communication unit 210, the information of the secondary users from the CBSD for managing secondary users. For example, the spectrum management apparatus 200 may acquire the above information of the current secondary users from the CBSD for managing current secondary users.

According to an embodiment of the present disclosure, the prediction unit 260 may divide the multiple current secondary users into multiple clusters, where information of the multiple current secondary users may include: position information of a cluster center of each cluster of the multiple clusters. That is, the position information of a cluster center of each cluster is used as an input to the neural network model.

According to an embodiment of the present disclosure, in a case that the number of current secondary users is greater than the threshold M of the number of secondary users, a clustering operation may be performed. In a case that the number of the current secondary users is smaller than or equal to the threshold M of the number of secondary users, the clustering operation may not be performed and the position information of each current secondary user is used as an input to the neural network model as described above. Here, a manner for clustering may be similar to that in the training process and is not repeated herein.

According to an embodiment of the present disclosure, position information of a cluster center may be represented in a way similar to the way in which the position information of the current secondary users is represented. For example, the position information of the cluster center may be represented by an absolute position of the cluster center or a relative position between the cluster center and a reference position. Here, the reference position includes, but is not limited to, the position of the current primary user, a position of a certain cluster center, a position of a certain current secondary user, the position of the spectrum management apparatus 200 and the like. In addition, exemplary, the position information may be represented in a form of a polar coordinate.

According to an embodiment of the present disclosure, the information of the multiple current secondary users may further include one or more of: information related to a radio propagation environment between the cluster center of each cluster and the current primary user, a superposition value of power of all current secondary users in each cluster. That is, the prediction unit 260 may further use one or more of pieces of above information as an input to the neural network. According to an embodiment of the present disclosure, the information related to the radio propagation environment between the current primary user and the cluster center includes, but is not limited to, path loss information between the current primary user and the cluster center. The superposition value of power of all current secondary users in each cluster may be a scalar superposition value or a vector superposition value of power of all current secondary users.

As describe above, in a case that the prediction unit 260 inputs the determined input information to the neural network model to a neural network model corresponding to the position of the current primary user, a value of the aggregate interference subjected by the current primary user may be obtained by using the neural network model.

According to an embodiment of the present disclosure, as shown in FIG. 2, the spectrum management apparatus 200 may further include the spectrum management unit 270, the spectrum management unit 270 is configured to perform, based on the predicted aggregate interference produced by the multiple current secondary users to the current primary user, spectrum management on the multiple current secondary users. Here, the spectrum management may be performed with a spectrum management method known in the art, for example, a method for re-allocating resources for current secondary users producing severe interference and the like.

As described above, according to an embodiment of the present disclosure, for ease of description, the primary user and the secondary user used during the training process are respectively referred to as the sample primary user and the sample secondary user, and the primary user and the secondary user used during the prediction process are respectively referred to as the current primary user and the current secondary user. There is no essential difference between the primary user used during the training process and the primary user used during the prediction process and there is also no essential difference between the secondary users used during the training process and the secondary users used during the prediction process. Actually, the sample primary user and the sample secondary user may be primary user and secondary user that once exited in history and determined based on historical information, that is, aggregate interference produced by the secondary users to the primary user is also known, such that the primary user and the secondary users that once exited in history may be used as samples for training a neural network. However, the current primary user and the current secondary users are primary user and secondary users at current time instant, and aggregate interference produced by the current secondary users to the current primary user is unknown, which is to be calculated.

Figure 9:
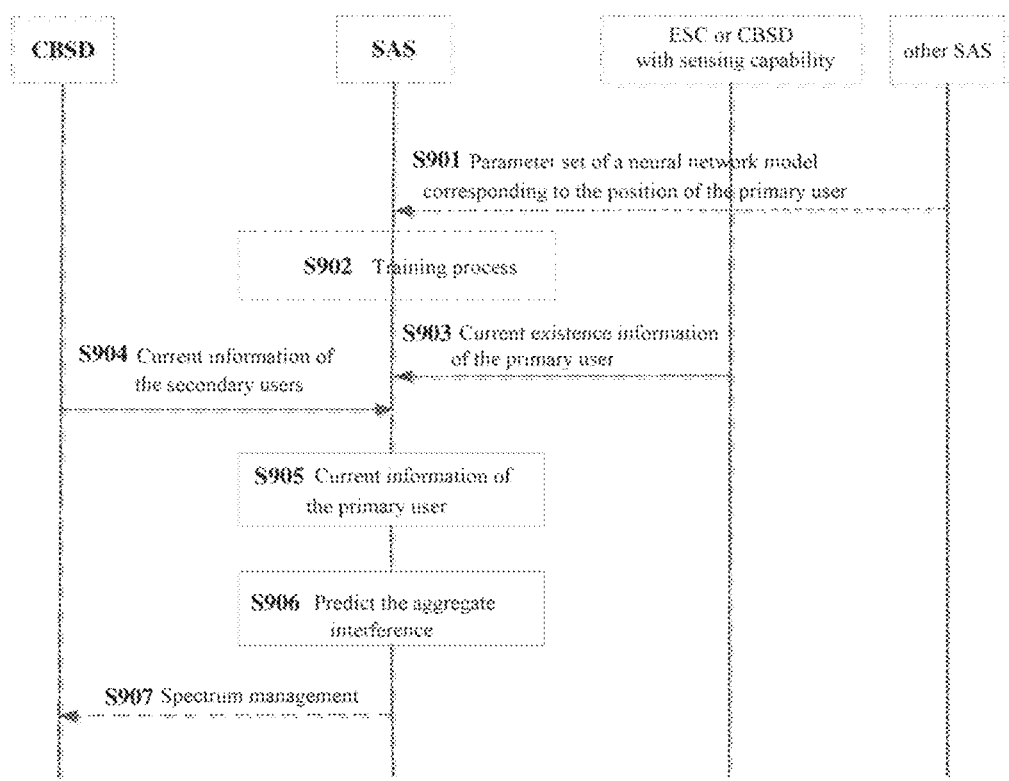
FIG. 9 shows a signaling flowchart of performing a prediction process performed by the spectrum access system (SAS) according to an embodiment of the present disclosure.

FIG. 9 shows a signaling flowchart of a prediction process performed by the SAS according to an embodiment of the present disclosure. The SAS may be implemented by the spectrum management apparatus 200 according to the present disclosure. The CBSD may be an apparatus for managing secondary users, and the ESC or the CBSD with sensing capability may be an apparatus for managing primary users. As shown in FIG. 9, in step S901, the SAS acquires the parameter set of a neural network model corresponding to the position of the primary user from another SAS. In an embodiment, in step S902, the SAS performs the training process as described above to acquire the parameter set of a neural network model corresponding to the position of the primary user. That is, the SAS may acquire the parameter set of a neural network model corresponding to the position of the primary user by step S901 or step S902. Next, in step S903, the SAS acquires current existence information of the primary user, such as current operation state information of the primary user, from the ESC or the CBSD with sensing capability. Next, in step S904, the SAS acquires current information of the secondary users from the CBSD, where the current information of the secondary users may include information related to positions of the secondary users, power of the secondary users, radio propagation environment between each secondary user and the primary user and the like. Next, in step S905, the SAS may acquire current information of the primary user by accessing a database, where the current information of the primary user may include a position of the primary user, the user type and the interference threshold of the primary user and the like. Next, in step S906, the SAS may determine, based on acquired various pieces of information, multiple current secondary users producing interference to the current primary user and obtain a value of aggregate interference subjected by the current primary user by using the information of the multiple current secondary users as an input to the neural network model. Next, in an embodiment, in step S907, the SAS may perform, based on the predicted value of the aggregate interference, spectrum management on the secondary users, for example, sending spectrum management information to the CBSD.

Figure 10:
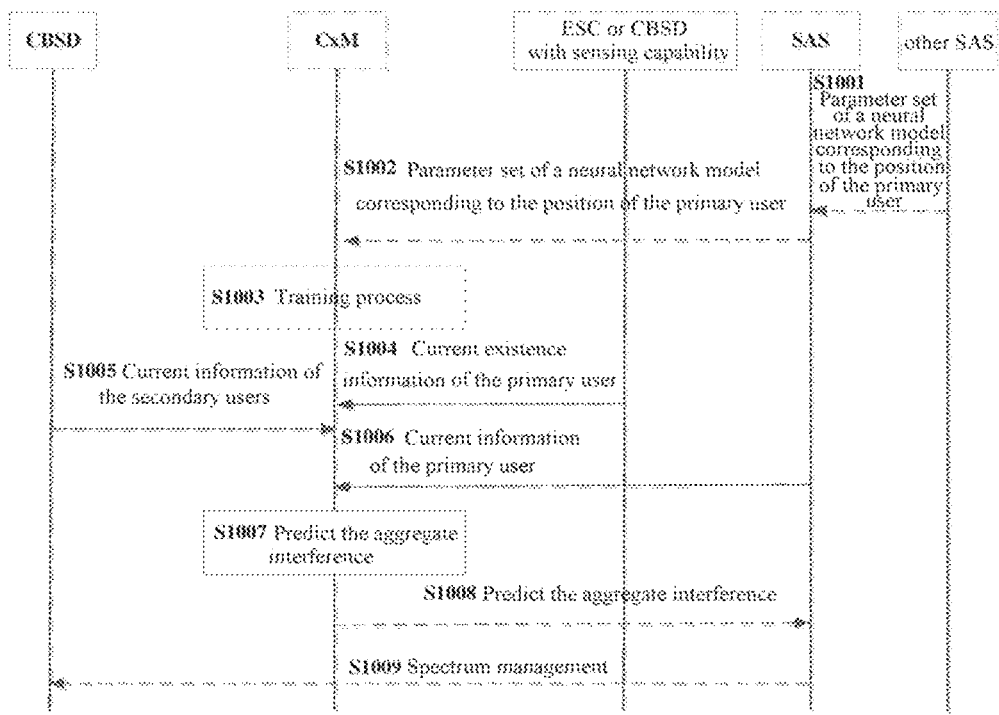
FIG. 10 shows a signaling flowchart of performing a prediction process by the coexistence manager (CxM) according to an embodiment of the present disclosure.

FIG. 10 shows a signaling flowchart of a prediction process performed by the C×M according to an embodiment of the present disclosure. The C×M may be implemented by the spectrum management apparatus 200 according to the present disclosure. The CBSD may be an apparatus for managing secondary users, and the ESC or the CBSD with sensing capability may be an apparatus for managing primary users. As shown in FIG. 10, in step S1001, the SAS acquires the parameter set of a neural network model corresponding to the position of the primary user from another SAS. In step S1002, the SAS sends the parameter set of a neural network model corresponding to the position of the primary user to the C×M. In an embodiment, in step S1003, the C×M performs the training process as described above to acquire the parameter set of a neural network model corresponding to the position of the primary user. That is, the C×M may acquire the parameter set of a neural network model corresponding to the position of the primary user by step S1001, step S1002 or step S1003. Next, in step S1004, the C×M acquires current existence information of the primary user, such as current operation state information of the primary user, from the ESC or the CBSD with sensing capability. Next, in step S1005, the C×M acquires current information of the secondary users from the CBSD, where the current information of the secondary users may include information related to positions of the secondary users, power of the secondary users, radio propagation environment between each secondary user and the primary user and the like. Next, in step S1006, the C×M may acquire current information of the primary user from the SAS, where the current information of the primary user may include a position of the primary user, the user type and the interference threshold of the primary user and the like. Next, in step S1007, the C×M may determine, based on acquired various pieces of information, multiple current secondary users producing interference to the current primary user and obtain a value of aggregate interference subjected by the current primary user by using the information of the multiple current secondary users as an input to the neural network model. Next, in an embodiment, in step S1008, the C×M may send the predicted value of the aggregate interference to the SAS. Next, in step S1009, the SAS may perform, based on the predicted value of the aggregate interference, spectrum management on the secondary users, for example, sending spectrum management information to the CBSD.

Thus, the spectrum management apparatus 200 according to an embodiment of the present disclosure may predict the value of the aggregate interference subjected by the current primary user by using a trained neural network model, such that a value of the aggregate interference can be accurately predicted based on an actual environmental condition and an actual distribution of users, thereby performing spectrum management reasonably.

Thus, according to an embodiment of the present disclosure, a neural network may be trained by using multiple samples, thereby acquiring a parameter set of a neural network model corresponding to the position of the primary user. Further, the parameter set of the trained neural network model may be shared among multiple spectrum management apparatus. In this way, the spectrum management apparatus can calculate aggregate interference by using the trained neural network model, such that a value of the aggregate interference can be accurately calculated based on an actual environmental condition and an actual distribution of users, thereby performing spectrum management reasonably.

3. Configuration Example of a Spectrum Management System

Figure 11:
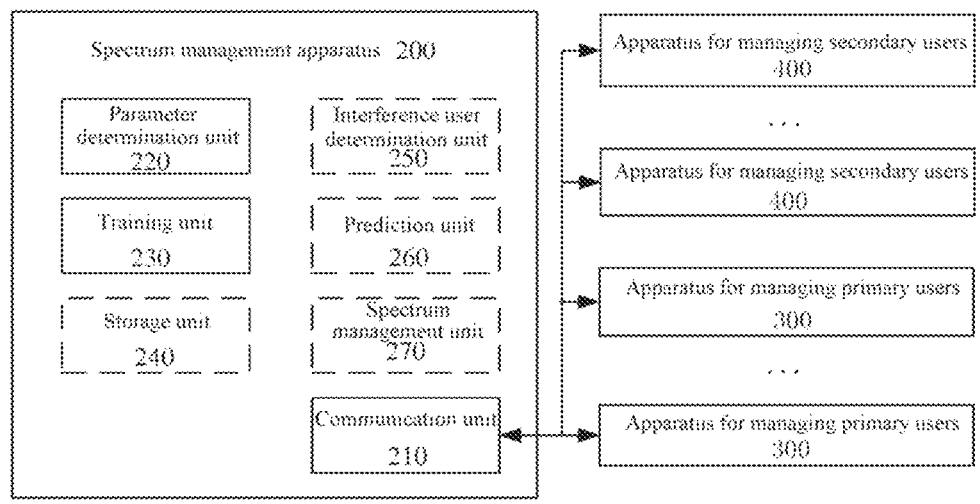
FIG. 11 is a block diagram showing a configuration example of a spectrum management system according to an embodiment of the present disclosure.

FIG. 11 is a block diagram showing a configuration example of a spectrum management system according to an embodiment of the present disclosure. As shown in FIG. 11, the spectrum management system may include the spectrum management apparatus 200, multiple apparatuses 300 for managing primary users and multiple apparatuses 400 for managing secondary users. Here, although FIG. 11 shows a case that the spectrum management system includes multiple apparatus 300 for managing primary users and multiple apparatus 400 for managing secondary users, the spectrum management system may include one apparatus 300 for managing primary users or one apparatus 400 for managing secondary users. Here, the apparatus 300 and the apparatus 400 may be network side apparatuses.

According to an embodiment of the present disclosure, the network side apparatus 400 for managing secondary users may send information of sample secondary users to the spectrum management apparatus 200. The information of the sample secondary users may include one or more of: position information of each sample secondary user, information related to a radio propagation environment between each sample secondary user and the sample primary user, power information of each sample secondary user and antenna radiation direction information of each sample secondary user.

According to an embodiment of the present disclosure, the network side apparatus 300 for managing primary users may send existence information of the sample primary user to the spectrum management apparatus 200.

According to an embodiment of the present disclosure, the spectrum management apparatus 200 may be configured to: acquire multiple pieces of sample information with respect to a position of the sample primary user, where each of the multiple pieces of sample information includes information of multiple sample secondary users and aggregate interference produced by the multiple sample secondary users to the sample primary user; and train a neural network model by using the information of the multiple sample secondary users as an input to the neural network model and using the aggregate interference produced by the multiple sample secondary users to the sample primary user as an output of the neural network model, to determine a parameter set of a neural network model corresponding to the position of the sample primary user.

According to an embodiment of the present disclosure, the network side apparatus 300 for managing primary users may further send the aggregate interference produced by the multiple sample secondary users to the sample primary user to the spectrum management apparatus 200.

According to an embodiment of the present disclosure, the network side apparatus 400 for managing secondary users may further send information of current secondary users to the spectrum management apparatus 200. The information of the current secondary users may include one or more of: position information of each current secondary user, information related to a radio propagation environment between each current secondary user and the current primary user, power information of each current secondary user and antenna radiation direction information of each current secondary user.

According to an embodiment of the present disclosure, the network side apparatus 300 for managing primary users may send existence information of the current primary user to the spectrum management apparatus 200.

According to an embodiment of the present disclosure, the spectrum management apparatus 200 may further be configured to: acquire information of multiple current secondary users with respect to a position of the current primary user; acquire a parameter set of a neural network model corresponding to the position of the current primary user; and predict aggregate interference produced by the multiple current secondary users to the current primary user, by using the information of the multiple current secondary users as an input to the neural network model corresponding to the position of the current primary user.

According to an embodiment of the present disclosure, the spectrum management apparatus 200 may acquire information of the sample secondary users and the current secondary users from the network side apparatus 400 for managing secondary users. That is, each secondary user is managed by a unique network side apparatus 400, and each network side apparatus 400 may manage one or more secondary users. In a case that sample secondary users or current secondary users are determined, the spectrum management apparatus 200 may acquire information of the sample secondary users or the current secondary users from the network side apparatus 400 for managing the sample secondary users or the current secondary users.

According to an embodiment of the present disclosure, the spectrum management apparatus 200 may acquire existence information of the sample primary user or the current primary user from the network side apparatus 300 for managing primary users. Here, the network side apparatus 300 may be a network side apparatus located closest to the sample primary user or the current primary user. In a case that the sample primary user or the current primary user is determined, the spectrum management apparatus 200 may acquire existence information of the sample primary user or the current primary user from the network side apparatus 300 located closest to the sample primary user or the current primary user.

According to an embodiment of the present disclosure, the spectrum management system may further include a database, and the spectrum management apparatus 200 may acquire information of a primary user from the database. The information of the primary user may include information of the sample primary user and information of the current primary user. The information of the sample primary user may include one or more of: position information of the sample primary user, the user type of the sample primary user and the interference threshold information of the sample primary user. The information of the current primary user may include one or more of: position information of the current primary user, the user type of the current primary user and the interference threshold information of the current primary user.

According to an embodiment of the present disclosure, the spectrum management apparatus 200 may further perform, based on the predicted aggregate interference produced by multiple current secondary users to the current primary user, spectrum management on the multiple current secondary users.

According to an embodiment of the present disclosure, the network side apparatus 400 for managing secondary users may include the CBSD. The network side apparatus 300 for managing primary users may include the ESC device or the CBSD with sensing capability. The spectrum management apparatus 200 may include the SAS or the C×M.

The spectrum management system according to an embodiment of the present disclosure may include the spectrum management apparatus 200. Therefore, all embodiments regarding the spectrum management apparatus 200 described above are suitable for this embodiment.

4. Method Embodiment

Next, the radio communication method performed by the spectrum management apparatus 200 according to an embodiment of the present disclosure is described in detail below.

<4.1 Method Embodiment of a Training Process>

Figure 12:
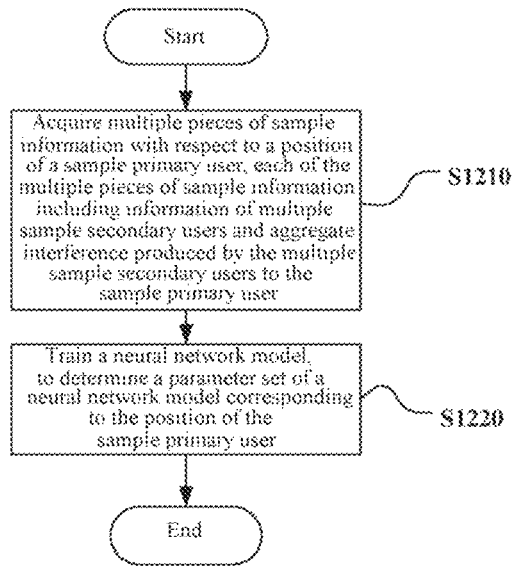
FIG. 12 is a flowchart of a method according to an embodiment of the present disclosure that is performed by a spectrum management apparatus.

FIG. 12 is a flowchart of a method performed by the spectrum management apparatus 200 according to an embodiment of the present disclosure. The method shown in FIG. 12 mainly includes a method for training a neural network model used for calculating aggregate interference produced by multiple secondary users to a primary user.

As shown in FIG. 12, in step S1210, multiple pieces of sample information is acquired with respect to a position of a sample primary user, where each of the multiple pieces of sample information includes information of multiple sample secondary users and aggregate interference produced by the multiple sample secondary users to the sample primary user.

Next, in step S1220, a neural network model is trained by using the information of the multiple sample secondary users as an input to the neural network model and using the aggregate interference produced by the multiple sample secondary users to the sample primary user as an output of the neural network model, to determine a parameter set of a neural network model corresponding to the position of the sample primary user.

In an embodiment, the method further includes: sending the parameter set of the neural network model corresponding to the position of the sample primary user to another spectrum management apparatus than the spectrum management apparatus 200, for the another spectrum management apparatus to predict, by using the neural network model, aggregate interference produced at the position of the sample primary user.

In an embodiment, information of the multiple sample secondary users includes position information of each sample secondary user of the multiple sample secondary users.

In an embodiment, the information of the multiple sample secondary users may further include one or more of: information related to a radio propagation environment between each sample secondary user and the sample primary user, power information of each sample secondary user and antenna radiation direction information of each sample secondary user.

In an embodiment, the method further includes: dividing the multiple sample secondary users into multiple clusters. The information of the multiple sample secondary users includes: position information of a cluster center of each cluster in the multiple clusters, information related to a radio propagation environment between the cluster center of each cluster and the sample primary user, and/or a superposition value of power of all sample secondary users in each cluster.

In an embodiment, the method further includes: determining, based on the user type and the interference threshold of the sample primary user, sample secondary users producing interference to the sample primary user as the multiple sample secondary users.

In an embodiment, the method further includes: acquiring, from network side apparatus for managing primary users, aggregate interference produced by the multiple sample secondary users to the sample primary user.

In an embodiment, the parameter set of the neural network model corresponding to the position of the sample primary user includes: node numbers of the input layer, the output layer and the implicit layers of the neural network model and weight coefficient information of the neural network model.

<4.2 Method Embodiment of a Prediction Process>

Figure 13:
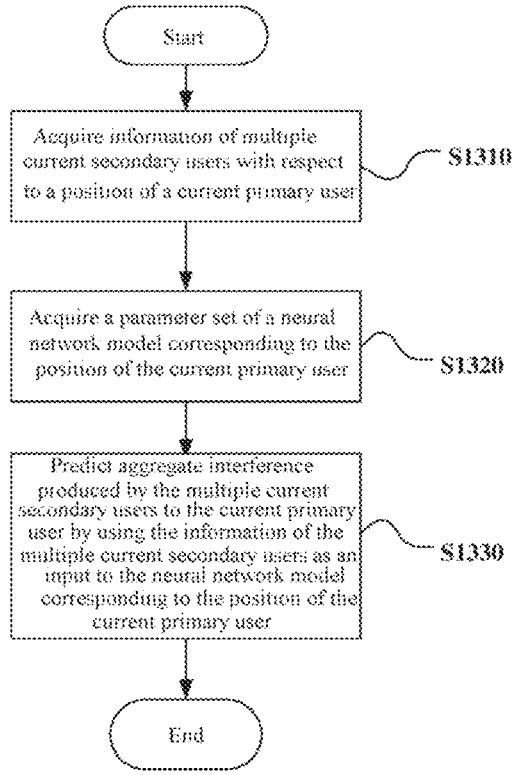
FIG. 13 is a flowchart of a method according to another embodiment of the present disclosure that is performed by a spectrum management apparatus.

FIG. 13 is a flowchart of a method performed by the spectrum management apparatus 200 according to another embodiment of the present disclosure. The method shown in FIG. 13 mainly includes a method for predicting aggregate interference produced by multiple secondary users to a primary user by using a neural network.

As shown in FIG. 13, in step S1310, information of multiple current secondary users is acquired with respect to a position of a current primary user.

Next, in step S1320, a parameter set of a neural network model corresponding to the position of the current primary user is acquired.

Next, in step S1330, aggregate interference produced by the multiple secondary users to the primary user is predicted by using the information of the multiple current secondary users as an input to the neural network model corresponding to the position of the current primary user.

In an embodiment, information of the multiple current secondary users includes position information of each current secondary user of the multiple current secondary users.

In an embodiment, the information of the multiple current secondary users may further include one or more of: information related to a radio propagation environment between each current secondary user and the current primary user, power information of each current secondary user and antenna radiation direction information of each current secondary user.

In an embodiment, the method further includes: dividing the multiple current secondary users into multiple clusters. The information of the multiple current secondary users includes: position information of a cluster center of each cluster in the multiple clusters, information related to a radio propagation environment between the cluster center of each cluster and the current primary user, and/or a superposition value of power of all current secondary users in each cluster.

In an embodiment, the method further includes: determining, based on the user type and the interference threshold of the current primary user, current secondary users producing interference to the current primary user as the multiple current secondary users.

In an embodiment, the method further includes: acquiring, from another spectrum management apparatus than the spectrum management apparatus 200, the parameter set of the neural network model corresponding to the position of the current primary user.

In an embodiment, the method further includes: determining, based on the position of the current primary user, whether the parameter set of the neural network model corresponding to the position of the current primary user is stored; acquiring, in a case that the parameter set of the neural network model corresponding to the position of the current primary user is not stored, multiple pieces of sample information by using the position of the current primary user as a position of a sample primary user, where each of the multiple pieces of sample information includes information of multiple sample secondary users and aggregate interference produced by the multiple sample secondary users to the sample primary user; and training a neural network by using the information of the multiple sample secondary users as an input to the neural network and using the aggregate interference produced by the multiple sample secondary users to the sample primary user as an output of the neural network, to determine a parameter set of a neural network model corresponding to the position of the sample primary user.

In an embodiment, the method further includes: performing, based on the predicted aggregate interference produced by the multiple current secondary users to the current primary user, spectrum management on the multiple current secondary users.

Figure 14:
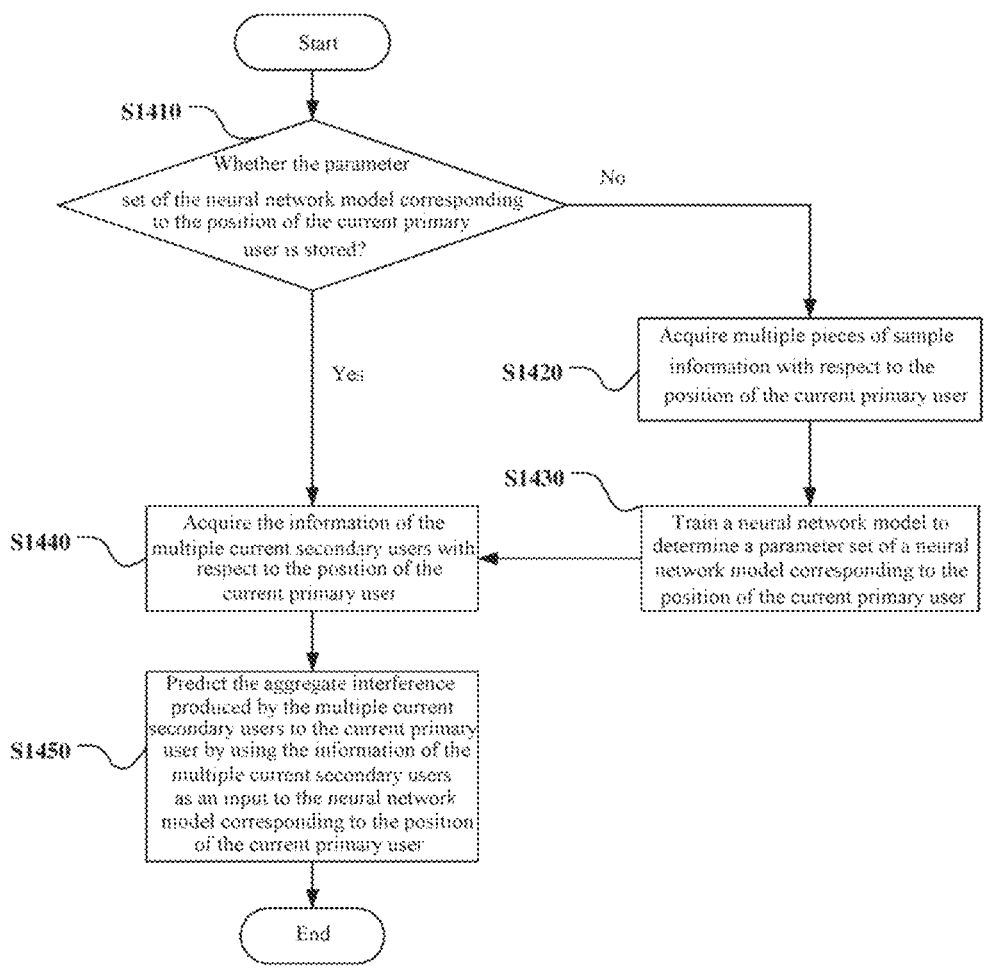
FIG. 14 is a flowchart of a method according to another embodiment of the present disclosure that is performed by a spectrum management apparatus.

FIG. 14 is a flowchart of a method performed by the spectrum management apparatus 200 according to another embodiment of the present disclosure.

As shown in FIG. 14, in step S1410, it is determined whether the parameter set of the neural network model corresponding to the position of the current primary user is stored.

In a case that it is determined, in step S1410, that the parameter set of the neural network model corresponding to the position of the current primary user is not stored, multiple pieces of sample information is acquired with respect to the position of the current primary user in step S1420, each of the multiple pieces of sample information includes information of multiple sample secondary users and the aggregate interference produced by the multiple sample secondary users to the sample primary user. Here, the position of the sample primary user is the same as the position of the current primary user.

Next, in step S1430, a neural network model is trained by using the information of the multiple sample secondary users as an input to the neural network model and using the aggregate interference produced by the multiple sample secondary users to the sample primary user as an output of the neural network model, to determine a parameter set of a neural network model corresponding to the position of the sample primary user.

Step S1440 is performed after step S1430 is performed.

In a case that it is determined, in step S1410, that the parameter set of the neural network model corresponding to the position of the current primary user is stored, step S1440 is performed directly. The information of the multiple current secondary users is acquired with respect to the position of the current primary user.

Next, in step S1450, the aggregate interference produced by the multiple secondary users to the primary user is predicted by using the information of the multiple current secondary users as an input to the neural network model corresponding to the position of the current primary user.

Thus, the method shown in FIG. 14 includes a method for training a neural network model used for calculating aggregate interference produced by multiple secondary users to a primary user and a method for predicting aggregate interference produced by multiple secondary users to a primary user by using a neural network. That is, FIG. 14 includes processes of the method shown in FIG. 12 and the method shown in FIG. 13.

According to an embodiment of the present disclosure, a subject for performing above method may be the spectrum management apparatus 200 according to an embodiment of the present disclosure. Therefore, all embodiments regarding the spectrum management apparatus 200 described above are suitable for this embodiment.

5. Application Example

The technology according to the present disclosure may be applied in various productions.

For example, the spectrum management apparatus 200 may be implemented by any types of servers, such as a tower server, a rack server and a blade server. The spectrum management apparatus 200 may be a control module installed in a server (such as an integrated circuit module including one chip and a card or a blade inserted into a slot of a blade server).

The network side apparatus may be implemented by any types of base station apparatus, such as a macro eNB and a small eNB. The network side apparatus may further be implemented by any types of gNB (a base station in a 5G system). The small eNB may be an eNB covering a cell smaller than a macro cell, such as a pico eNB, a micro eNB and a home (femto) eNB. Alternatively, the base station may be implemented by any other type of base stations, such as a NodeB and a base transceiver station (BTS). The base station may include: a body configured to control radio communication (which is also referred to as a base station apparatus); and one or more remote radio heads (RRH) located at positions different from the body.

The user equipment (including the primary user equipment and the secondary user equipment) may be implemented by a mobile terminal (such as a smart phone, a tablet personal computer (PC), a notebook PC, a portable game terminal, a portable/dongle type mobile router, and a digital camera apparatus) or an in-vehicle terminal (such as a vehicle navigation apparatus). The user equipment may also be implemented by a terminal (which is also referred to as a machine type communication (MTC) terminal) that performs machine-to-machine (M2M) communication. Furthermore, the user equipment may be a radio communication module (such as an integrated circuit module including a single chip) mounted on each of the above user equipment.

<Application Example of a Server>

Figure 15:
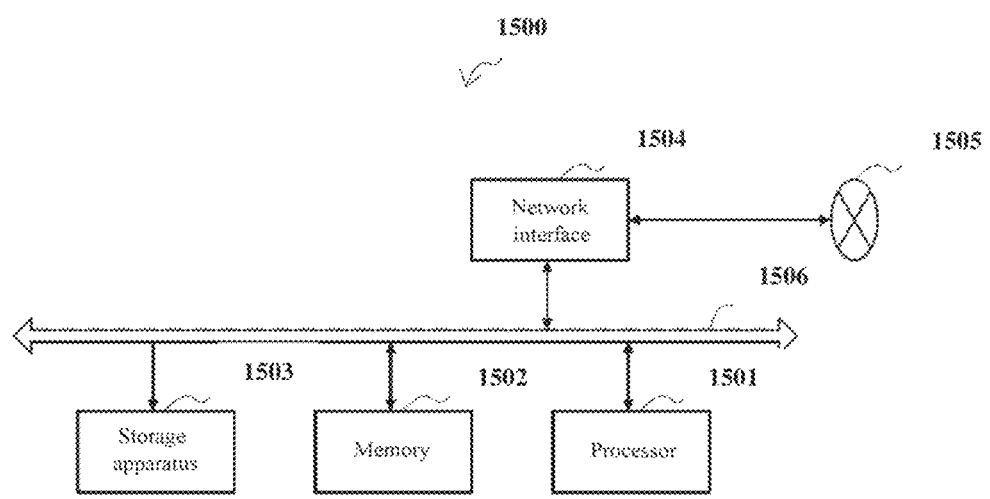
FIG. 15 is a block diagram showing an example of a schematic configuration of a server.

FIG. 15 is a block diagram showing an example of a server 1500 by which the spectrum management apparatus 200 according to the present disclosure may be implemented. The server 1500 includes a processor 1501, a memory 1502, a storage apparatus 1503, a network interface 1504 and a bus 1506.

The processor 1501 may be, for example, a central processing unit (CPU) or a digital signal processor (DSP) and controls a function of the server 1500. The memory 1502 includes a random access memory (RAM) and a read only memory (ROM), and stores data and programs executed by the processor 1501. The storage apparatus 1503 may include a storage medium such as a semiconductor memory and a hard disk.

The network interface 1504 is a wire communication interface for connecting the server 1500 to a wire communication network 1505. The wire communication network 1505 may be a core network such as an evolved packet core (EPC) network or a packet data network (PDN) such as the Internet.

The bus 1506 connects the processor 1501, the memory 1502, the storage apparatus 1503 and the network interface 1504 to each other. The bus 1506 may include two or more buses having different speed respectively (such as high speed buses and low speed buses).

In the server 1500 as shown in FIG. 15, the parameter determination unit 220, the training unit 230, the interference user determination unit 250, the prediction unit 260 and the spectrum management unit 270 described with reference to FIG. 2 may be implemented by the processor 1501, and the communication unit 210 described with reference to FIG. 2 may be implemented by the network interface 1504. For example, the processor 1501 may perform functions such as determining parameters for training a neural network, training a neural network, determining secondary users producing interference to a primary user, predicting aggregate interference and performing spectrum management by executing instructions stored in the memory 1502 or the storage apparatus 1503.

<Application Example of a Base Station>

First Application Example

Figure 16:
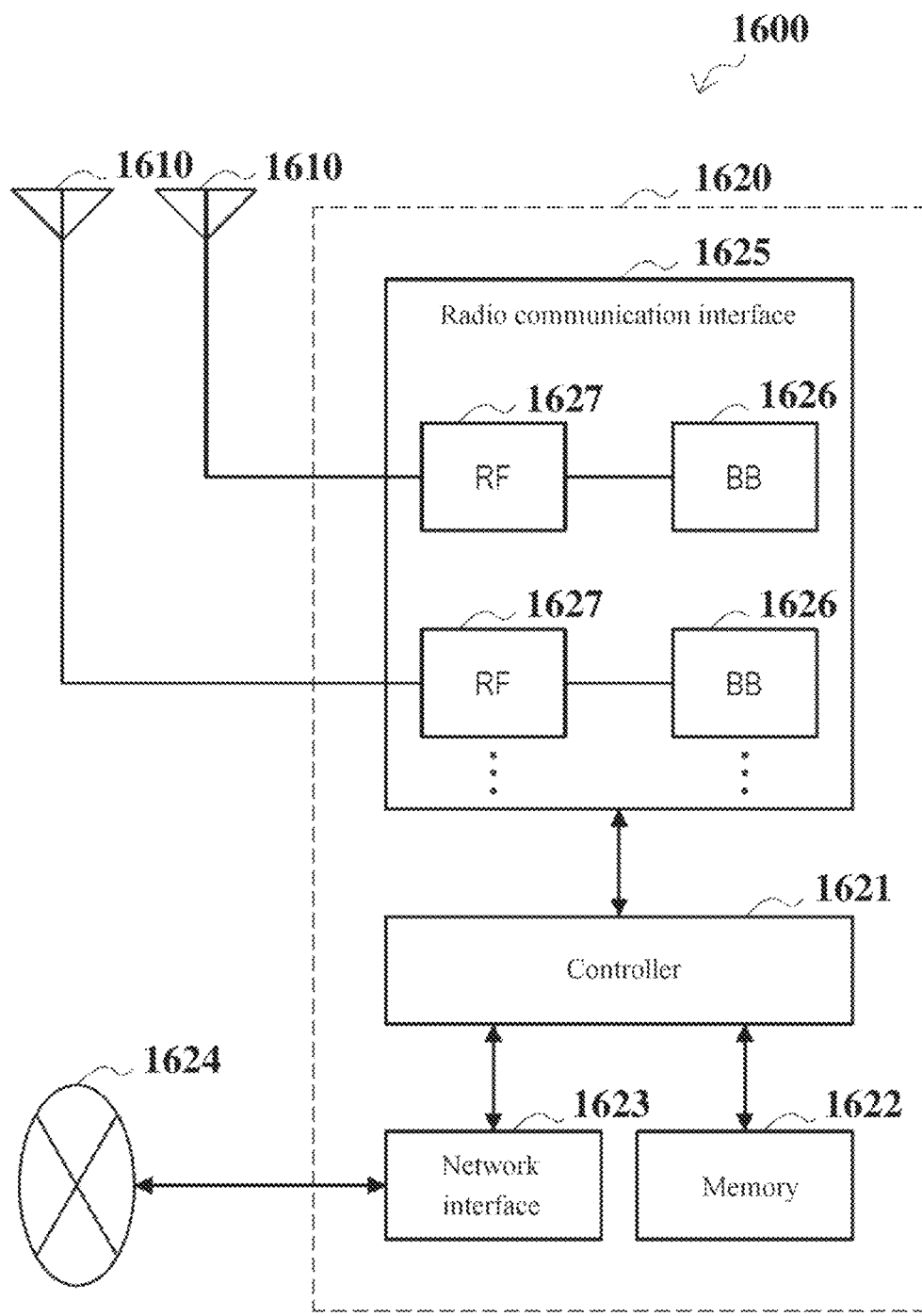
FIG. 16 is a block diagram showing a first example of a schematic configuration of an evolved node B (eNB)

FIG. 16 is a block diagram showing a first example of a schematic configuration of an eNB to which the technology according to the present disclosure may be applied. An eNB 1600 includes one or more antennas 1610 and a base station apparatus 1620. The base station apparatus 1620 and each antenna 1610 may be connected to each other via a radio frequency (RF) cable.

Each of the antennas 1610 includes a single or multiple antenna elements (such as multiple antenna elements included in a multiple input multiple output (MIMO) antenna) and is used by the base station apparatus 1620 to transmit and receive radio signals. As shown in FIG. 16, the eNB 1600 may include multiple antennas 1610. For example, the multiple antennas 1610 may be compatible with multiple frequency bands used by the eNB 1600. Although FIG. 16 shows an example in which the eNB 1600 includes multiple antennas 1610, the eNB 1600 may include a single antenna 1610.

The base station apparatus 1620 includes a controller 1621, a memory 1622, a network interface 1623 and a radio communication interface 1625.

The controller 1621 may be a CPU or a DSP and control various functions of higher layers of the base station apparatus 1620. For example, the controller 1621 generates a data packet based on data in a signal processed by the radio communication interface 1625, and transfers the generated packet via a network interface 1623. The controller 1621 may bind data from multiple baseband processors to generate a binding packet and transfer the generated binding packet. The controller 1621 may have logic functions for performing a control such as radio resource control, radio carrying control, mobility management, admission control and schedule. The control may be performed in combination with an adjacent eNB or a core network node. The memory 1622 includes RAM and ROM, and stores programs executed by the controller 1621 and various types of control data (such as a terminal list, transmission power data and scheduling data).

The network interface 1623 is configured to connect the base station apparatus 1620 to a communication interface of the core network 1624. The controller 1621 may communicate with the core network node or another eNB via the network interface 1623. In this case, the eNB 1600 may be connected with the core network node or another eNB via a logic interface (such as an Si interface and an X2 interface). The network interface 1623 may be a wired communication interface or a radio communication interface for a radio backhaul line. If the network interface 1623 is a radio communication interface, the network interface 1623 may use a higher frequency band for radio communication as compared with the frequency band used by the radio communication interface 1625.

The radio communication interface 1625 supports any cellular communication scheme (such as long term evolution (LTE) and LTE-advanced), and provides a radio connection to a terminal located in a cell of the eNB 1600 via an antenna 1610. The radio communication interface 1625 may generally include, for example, a baseband (BB) processor 1626 and an RF circuit 1627. The BB processor 1626 may perform, for example, encoding/decoding, modulating/demodulating and multiplexing/demultiplexing, and various types of signal processing of layers (such as L1, medium access control (MAC), radio link control (RLC) and packet data convergence protocol (PDCP)). Instead of the controller 1621, the BB processor 1626 may perform a part or all of the above logic functions. The BB processor 1626 may be a memory storing communication control programs or a module including a processor configured to execute programs and a related circuit. Updating programs may change functions of the BB processor 1626. The module may be a card or a blade inserted into a slot of the base station apparatus 1620. Alternatively, the module may be a chip installed on the card or the blade. The RF circuit 1627 may include, for example, a frequency mixer, a filter and an amplifier, and transmits and receives radio signals via the antenna 1610.

As shown in FIG. 16, the radio communication interface 1625 may include multiple BB processors 1626. For example, the multiple BB processors 1626 may be compatible with multiple frequency bands used by the eNB 1600. As shown in FIG. 16, the radio communication interface 1625 may include multiple RF circuits 1627. For example, the multiple RF circuits 1627 may be compatible with multiple antenna elements. Although FIG. 16 shows an example in which the radio communication interface 1625 includes multiple BB processors 1626 and multiple RF circuits 1627, the radio communication interface 1625 may include a single BB processor 1626 or a single RF circuit 1627.

Second Application Example

Figure 17:
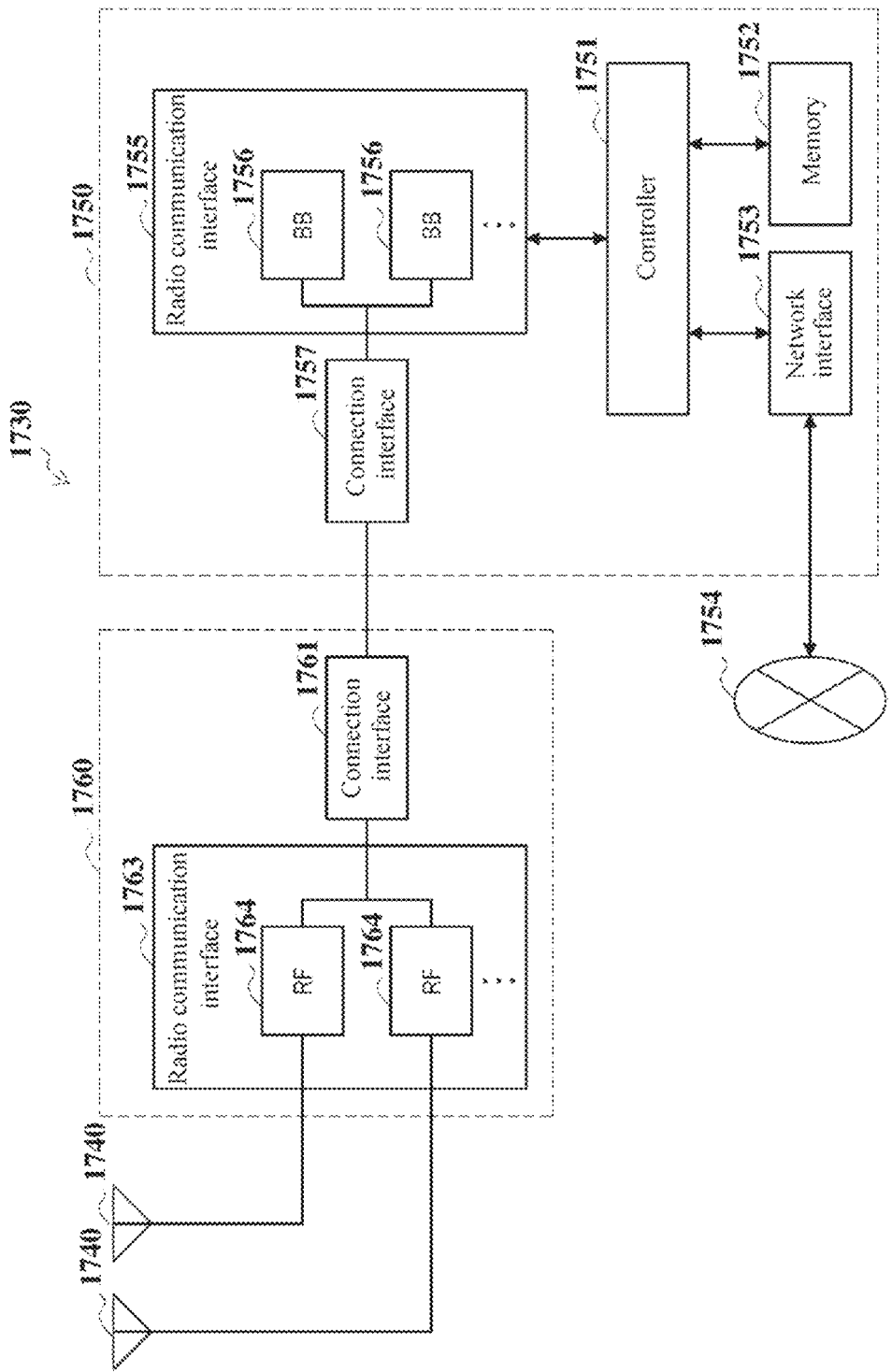
FIG. 17 is a block diagram showing a second example of the schematic configuration of the eNB.

FIG. 17 is a block diagram showing a second example of a schematic configuration of an eNB to which the technology of the present disclosure may be applied. An eNB 1730 includes one or more antennas 1740, a base station apparatus 1750 and an RRH 1760. The RRH 1760 may be connected to each of the antennas 1740 via an RF cable. The base station apparatus 1750 and the RRH 1760 may be connected to each other via a high speed line such as an optical fiber cable.

Each of the antennas 1740 includes a single or multiple antenna elements (such as multiple antenna elements included in a MIMO antenna), and is used by the RRH 1760 to transmit and receive radio signals. As shown in FIG. 17, the eNB 1730 may include multiple antennas 1740. For example, the multiple antennas 1740 may be compatible with multiple frequency bands used by the eNB 1730. Although FIG. 17 shows an example in which the eNB 1730 includes the multiple antennas 1740, the eNB 1730 may also include a single antenna 1740.

The base station apparatus 1750 includes a controller 1751, a memory 1752, a network interface 1753, a radio communication interface 1755, and a connection interface 1757. The controller 1751, the memory 1752, and the network interface 1753 are respectively the same as the controller 1621, the memory 1622, and the network interface 1623 described with reference to FIG. 16.

The radio communication interface 1755 supports any cellular communication schemes (such as the LTE and the LTE-advanced), and provides radio communication with a terminal located in a sector corresponding to the RRH 1760 via the RRH 1760 and the antenna 1740. The radio communication interface 1755 may generally include, for example, a BB processor 1756. Except for the BB processor 1756 being connected to a RF circuit 1764 of the RRH 1760 via the connection interface 1757, the BB processor 1756 is the same as the BB processor 1626 described with reference to FIG. 16. The radio communication interface 1755 may include multiple BB processors 1756, as shown in FIG. 17. For example, the multiple BB processors 1756 may be compatible with multiple frequency bands used by the eNB 1730. Although FIG. 17 shows an example in which the radio communication interface 1755 includes multiple BB processors 1756, the radio communication interface 1755 may also include a single BB processor 1756.

The connection interface 1757 is an interface for connecting the base station apparatus 1750 (the radio communication interface 1755) to the RRH 1760. The connection interface 1757 may also be a communication module for communication in the above high-speed line that connects the base station apparatus 1750 (the radio communication interface 1755) to the RRH 1760.

The RRH 1760 includes a connection interface 1761 and a radio communication interface 1763.

The connection interface 1761 is an interface for connecting the RRH 1760 (the radio communication interface 1763) to the base station apparatus 1750. The connection interface 1761 may also be a communication module for communication in the above-described high-speed line.

The radio communication interface 1763 transmits and receives radio signals via the antenna 1740. The radio communication interface 1763 may generally include, for example, the RF circuit 1764. The RF circuit 1764 may include, for example, a frequency mixer, a filter, and an amplifier, and transmits and receives radio signals via the antenna 1740. The radio communication interface 1763 may include multiple RF circuits 1764, as shown in FIG. 17. For example, the multiple RF circuits 1764 may support multiple antenna elements. Although FIG. 17 shows an example in which the radio communication interface 1763 includes the multiple RF circuits 1764, the radio communication interface 1763 may also include a single RF circuit 1764.

<Application Example of a Terminal Apparatus>

First Application Example

Figure 18:
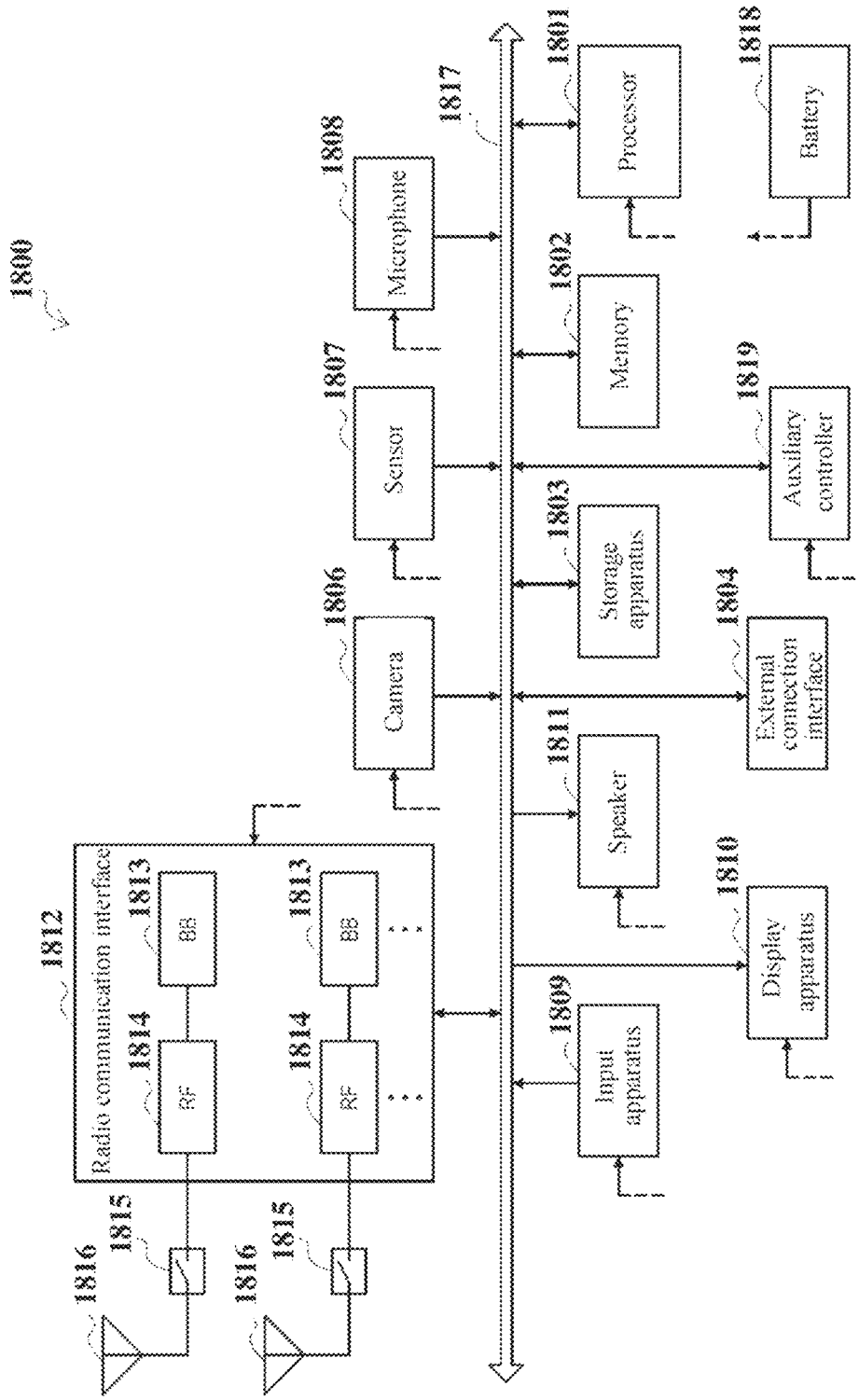
FIG. 18 is a block diagram showing an example of a schematic configuration of a smart phone.

FIG. 18 is a block diagram showing an example of a schematic configuration of a smart phone 1800 to which the technology according to the present disclosure may be applied. The smart phone 1800 includes a processor 1801, a memory 1802, a storage apparatus 1803, an external connection interface 1804, a camera 1806, a sensor 1807, a microphone 1808, an input apparatus 1809, a display apparatus 1810, a speaker 1811, a radio communication interface 1812, one or more antenna switches 1815, one or more antennas 1816, a bus 1817, a battery 1818, and an auxiliary controller 1819.

The processor 1801 may be, for example, a CPU or a system on a chip (SoC), and controls functions of an application layer and another layer of the smart phone 1800. The memory 1802 includes RAM and ROM, and stores a program that is executed by the processor 1801, and data. The storage apparatus 1803 may include a storage medium such as a semiconductor memory and a hard disk. The external connection interface 1804 is an interface for connecting an external apparatus (such as a memory card and a universal serial bus (USB) apparatus) to the smart phone 1800.

The camera 1806 includes an image sensor (such as a charge coupled device (CCD) and a complementary metal oxide semiconductor (CMOS)), and generates a captured image. The sensor 1807 may include a group of sensors such as a measurement sensor, a gyro sensor, a geomagnetic sensor, and an acceleration sensor. The microphone 1808 converts sounds that are inputted to the smart phone 1800 into audio signals. The input apparatus 1809 includes, for example, a touch sensor configured to detect touch onto a screen of the display apparatus 1810, a keypad, a keyboard, a button, or a switch, and receives an operation or information inputted by a user. The display apparatus 1810 includes a screen (such as a liquid crystal display (LCD) and an organic light-emitting diode (OLED) display), and displays an output image of the smart phone 1800. The speaker 1811 converts audio signals that are outputted from the smart phone 1800 into sounds.

The radio communication interface 1812 supports any cellular communication scheme (such as LTE and LTE-Advanced), and performs radio communication. The radio communication interface 1812 may generally include, for example, a BB processor 1813 and an RF circuit 1814. The BB processor 1813 may perform, for example, encoding/decoding, modulating/demodulating, and multiplexing/demultiplexing, and performs various types of signal processing for radio communication. In addition, the RF circuit 1814 may include, for example, a frequency mixer, a filter, and an amplifier, and transmits and receives radio signals via the antenna 1816. The radio communication interface 1812 may be a chip module having the BB processor 1813 and the RF circuit 1814 integrated thereon. The radio communication interface 1812 may include multiple BB processors 1813 and multiple RF circuits 1814, as shown in FIG. 18. Although FIG. 18 shows the example in which the radio communication interface 1812 includes the multiple BB processors 1813 and the multiple RF circuits 1814, the radio communication interface 1812 may include a single BB processor 1813 or a single RF circuit 1814.

Furthermore, in addition to a cellular communication scheme, the radio communication interface 1812 may support another type of radio communication scheme such as a short-distance radio communication scheme, a near field communication scheme, and a radio local area network (LAN) scheme. In this case, the radio communication interface 1812 may include the BB processor 1813 and the RF circuit 1814 for each radio communication scheme.

Each of the antenna switches 1815 switches connection destinations of the antennas 1816 among multiple circuits (such as circuits for different radio communication schemes) included in the radio communication interface 1812.

Each of the antennas 1816 includes a single or multiple antenna elements (such as multiple antenna elements included in an MIMO antenna), and is used by the radio communication interface 1812 to transmit and receive radio signals. The smart phone 1800 may include multiple antennas 1816, as shown in FIG. 18. Although FIG. 18 shows the example in which the smart phone 1800 includes multiple antennas 1816, the smart phone 1800 may include a single antenna 1816.

Furthermore, the smart phone 1800 may include the antenna 1816 for each radio communication scheme. In this case, the antenna switches 1815 may be omitted from the configuration of the smart phone 1800.

The bus 1817 connects the processor 1801, the memory 1802, the storage apparatus 1803, the external connection interface 1804, the camera 1806, the sensor 1807, the microphone 1808, the input apparatus 1809, the display apparatus 1810, the speaker 1811, the radio communication interface 1812, and the auxiliary controller 1819 to each other. The battery 1818 supplies power to various components of the smart phone 1800 shown in FIG. 18 via feeder lines, which are partially shown as dashed lines in FIG. 18. The auxiliary controller 1819 operates a minimum necessary function of the smart phone 1800, for example, in a sleep mode.

Second Application Example

Figure 19:
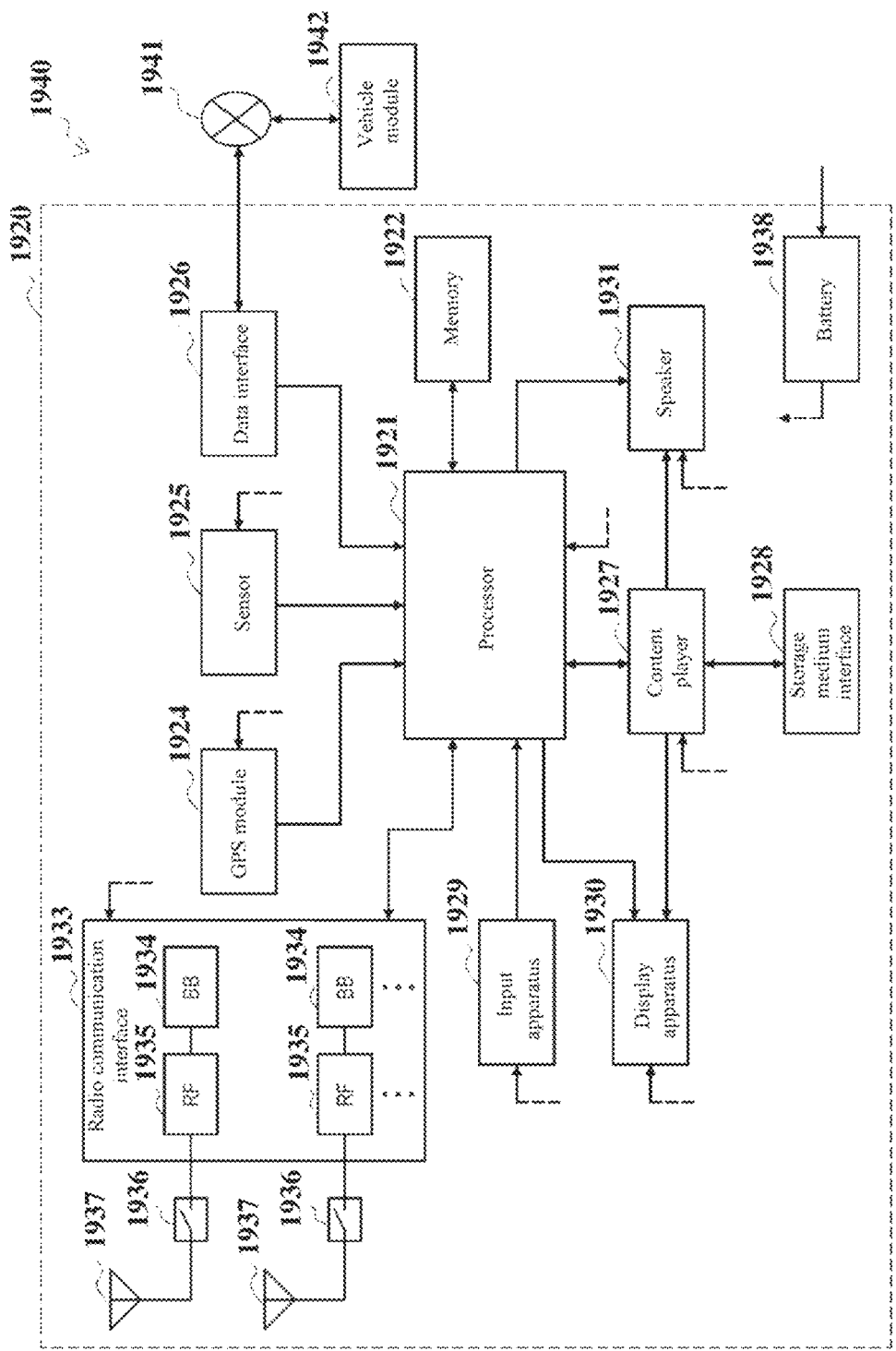
FIG. 19 is a block diagram showing an example of a schematic configuration of a vehicle navigation apparatus.

FIG. 19 is a block diagram showing an example of a schematic configuration of a vehicle navigation apparatus 1920 to which the technology according to the present disclosure may be applied. The vehicle navigation apparatus 1920 includes a processor 1921, a memory 1922, a global positioning system (GPS) module 1924, a sensor 1925, a data interface 1926, a content player 1927, a storage medium interface 1928, an input apparatus 1929, a display apparatus 1930, a speaker 1931, a radio communication interface 1933, one or more antenna switches 1936, one or more antennas 1937, and a battery 1938.

The processor 1921 may be, for example, a CPU or a SoC, and controls a navigation function and another function of the vehicle navigation apparatus 1920. The memory 1922 includes RAM and ROM, and stores a program that is executed by the processor 1921, and data.

The GPS module 1924 uses GPS signals received from a GPS satellite to measure a position (such as a latitude, a longitude, and an altitude) of the vehicle navigation apparatus 1920. The sensor 1925 may include a group of sensors such as a gyro sensor, a geomagnetic sensor, and an air pressure sensor. The data interface 1926 is connected to, for example, an in-vehicle network 1941 via a terminal that is not shown, and acquires data generated by the vehicle, such as vehicle speed data.

The content player 1927 reproduces content stored in a storage medium (such as a CD and a DVD) that is inserted into the storage medium interface 1928. The input apparatus 1929 includes, for example, a touch sensor configured to detect touch on a screen of the display apparatus 1930, a button, or a switch, and receives an operation or information inputted by a user. The display apparatus 1930 includes a screen such as a LCD or an OLED display, and displays an image of the navigation function or content that is reproduced. The speaker 1931 outputs sounds of the navigation function or the content that is reproduced.

The radio communication interface 1933 supports any cellular communication scheme (such as LTE and LTE-Advanced), and performs radio communication. The radio communication interface 1933 may generally include, for example, a BB processor 1934 and an RF circuit 1935. The BB processor 1934 may perform, for example, encoding/decoding, modulating/demodulating, and multiplexing/demultiplexing, and performs various types of signal processing for radio communication. In addition, the RF circuit 1935 may include, for example, a frequency mixer, a filter, and an amplifier, and transmits and receives radio signals via the antenna 1937. The radio communication interface 1933 may also be one chip module that has the BB processor 1934 and the RF circuit 1935 integrated thereon. The radio communication interface 1933 may include multiple BB processors 1934 and multiple RF circuits 1935, as shown in FIG. 19. Although FIG. 19 shows the example in which the radio communication interface 1933 includes the multiple BB processors 1934 and the multiple RF circuits 1935, the radio communication interface 1933 may include a single BB processor 1934 or a single RF circuit 1935.

Furthermore, in addition to a cellular communication scheme, the radio communication interface 1933 may support another type of radio communication scheme such as a short-distance radio communication scheme, a near field communication scheme, and a radio LAN scheme. In that case, the radio communication interface 1933 may include the BB processor 1934 and the RF circuit 1935 for each radio communication scheme.

Each of the antenna switches 1936 switches connection destinations of the antennas 1937 among multiple circuits (such as circuits for different radio communication schemes) included in the radio communication interface 1933.

Each of the antennas 1937 includes a single or multiple antenna elements (such as multiple antenna elements included in an MIMO antenna), and is used by the radio communication interface 1933 to transmit and receive radio signals. The vehicle navigation apparatus 1920 may include multiple antennas 1937, as shown in FIG. 19. Although FIG. 19 shows the example in which the vehicle navigation apparatus 1920 includes the multiple antennas 1937, the vehicle navigation apparatus 1920 may include a single antenna 1937.

Furthermore, the vehicle navigation apparatus 1920 may include the antenna 1937 for each radio communication scheme. In that case, the antenna switches 1936 may be omitted from the configuration of the vehicle navigation apparatus 1920.

The battery 1938 supplies power to various components of the vehicle navigation apparatus 1920 shown in FIG. 19 via feeder lines that are partially shown as dashed lines in the FIG. 19. The battery 1938 accumulates power supplied form the vehicle.

The technology of the present disclosure may also be implemented by an in-vehicle system (or a vehicle) 1940 including one or more components of the vehicle navigation apparatus 1920, the in-vehicle network 1941, and a vehicle module 1942. The vehicle module 1942 generates vehicle data (such as a vehicle speed, an engine speed, and fault information), and outputs the generated data to the in-vehicle network 1941.

Preferred embodiments of the present disclosure are described above with reference to the drawings, however, the present disclosure is not limited to above examples. Those skilled in the art may obtain various modifications and changes within the scope of the appended claims and should understand that these modifications and changes naturally fall within the technical scope of the present disclosure.

For example, a unit shown with a dashed-line block in functional block diagrams shown in the drawings indicates that the functional unit is optional in corresponding apparatus and each optional functional unit may be combined in a suitable manner to achieve needed functions.

For example, in above embodiments, multiple functions included in one unit may be achieved by separated apparatus. Alternately, in above embodiments, multiple functions achieved by multiple units may be achieved by separated apparatus. In addition, one of above functions may be achieved by multiple units. It is needless to mention that these configurations are included in the technical scope of the present disclosure.

In this specification, steps described in the flowcharts include processes carried out in time series according to the described order and processes not necessarily carried out in time series and carried out in parallel or individually. In addition, even in steps processed in time series, it is needless to mention that the time series may be changed properly.

Although the embodiments of the present disclosure have been described above in detail with reference to the drawings, it should be understood that the above-described embodiments are merely used for illustrating the present disclosure and are not intended to limit the present disclosure. Those skilled in the art can make various modifications and variations to the above-described embodiments without departing from the substance and scope of the present disclosure. Accordingly, the scope of the present disclosure is defined only by the appended claims and their equivalents.

The invention claimed is:

1. A spectrum management apparatus, comprising processing circuitry configured to:
   acquire a plurality of pieces of sample information with respect to a position of a sample primary user, each of the plurality of pieces of sample information comprising information of a plurality of sample secondary users and aggregate interference produced by the plurality of sample secondary users to the sample primary user; and
   train a neural network model by using the information of the plurality of sample secondary users as an input to the neural network model and using the aggregate interference produced by the plurality of sample secondary users to the sample primary user as an output of the neural network model, to determine a parameter set of a neural network model corresponding to the position of the sample primary user,
   wherein the processing circuitry is further configured to:
   acquire information of a plurality of current secondary users with respect to a position of a current primary user;
   acquire a parameter set of a neural network model corresponding to the position of the current primary user; and
   predict aggregate interference produced by the plurality of current secondary users to the current primary user, by using the information of the plurality of current secondary users as an input to the neural network model corresponding to the position of the current primary user.

2. The spectrum management apparatus according to claim 1, wherein the processing circuitry is further configured to:
   send the parameter set of the neural network model corresponding to the position of the sample primary user to another spectrum management apparatus than the spectrum management apparatus, for the another spectrum management apparatus to predict, using the neural network model, aggregate interference produced at the position of the sample primary user.

3. The spectrum management apparatus according to claim 1, wherein the information of the plurality of current secondary users comprises position information of each current secondary user of the plurality of current secondary users.

4. The spectrum management apparatus according to claim 3, wherein the information of the plurality of current secondary users further comprises one or more of: information related to a radio propagation environment between each current secondary user and the current primary user; power information of each current secondary user; and antenna radiation direction information of each current secondary user.

5. The spectrum management apparatus according to claim 1, wherein the processing circuitry is further configured to: divide the plurality of current secondary users into a plurality of clusters, and
   wherein the information of the plurality of current secondary users comprises: position information of a cluster center of each cluster of the plurality of clusters, information related to a radio propagation environment between the duster center of each cluster and the current primary user, and/or a superposition value of power of all current secondary users in each cluster.

6. The spectrum management apparatus according to claim 1, wherein the plurality of current secondary users are current secondary users producing interference to the current primary user determined according to a user type and an interference threshold of the current primary user.

7. The spectrum management apparatus according to claim 1, wherein the processing circuitry is further configured to:
   determine, according to the position of the current primary user, whether or not the parameter set of the neural network model corresponding to the position of the current primary user is stored; and
   use the position of the current primary user as the position of the sample primary user to acquire the plurality of pieces of sample information, in a case where the parameter set of the neural network model corresponding to the position of the current primary user is not stored.

8. The spectrum management apparatus according to claim 1, wherein the processing circuitry is further configured to:
   perform spectrum management on the plurality of current secondary users according to the predicted aggregate interference produced by the plurality of current secondary users to the current primary user.

9. The spectrum management apparatus according to claim 1, wherein
   the information of the plurality of sample secondary users comprises position information of each sample secondary user of the plurality of sample secondary users; or
   the information of the plurality of sample secondary users comprises position information of each sample secondary user of the plurality of sample secondary users and one or more of: information related to a radio propagation environment between each sample secondary user and the sample primary user; power information of each sample secondary user; and antenna radiation direction information of each sample secondary user.

10. The spectrum management apparatus according to claim 1, wherein the processing circuitry is further configured to: divide the plurality of sample secondary users into a plurality of clusters, and
    wherein the information of the plurality of sample secondary users comprises: position information of a cluster center of each cluster of the plurality of clusters, information related to a radio propagation environment between the cluster center of each cluster and the sample primary user, and/or a superposition value of power of all sample secondary users in each cluster.

11. The spectrum management apparatus according to claim 1, wherein the plurality of sample secondary users are sample secondary users producing interference to the sample primary user determined according to a user type and an interference threshold of the sample primary user.

12. The spectrum management apparatus according to claim 1, wherein the processing circuitry is further configured to:
acquire, from a network side apparatus for managing primary users, aggregate interference produced by the plurality of sample secondary users to the sample primary user.

13. The spectrum management apparatus according to claim 1, wherein the parameter set of the neural network model corresponding to the position of the sample primary user comprises: node numbers of an input layer, an output layer and an implicit layer of the neural network model; and weight coefficient information of the neural network model.

14. The spectrum management apparatus according claim 1, wherein the spectrum management apparatus comprises a Spectrum Access System SAS or a Coexistence Manager C×M.

15. A spectrum management system, comprising:
one or more network side apparatuses for managing secondary users, configured to send information of sample secondary users to a spectrum management apparatus;
one or more network side apparatuses for managing primary users, configured to send existence information of a sample primary user to the spectrum management apparatus; and
the spectrum management apparatus configured to:
acquire a plurality of pieces of sample information with respect to a position of the sample primary user, each of the plurality of pieces of sample information comprising information of a plurality of sample secondary users and aggregate interference produced by the plurality of sample secondary users to the sample primary user; and
train a neural network model by using the information of the plurality of sample secondary users as an input to the neural network model and using the aggregate interference produced by the plurality of sample secondary users to the sample primary user as an output of the neural network model, to determine a parameter set of a neural network model corresponding to the position of the sample primary user,
wherein:
the network side apparatus for managing secondary users is further configured to send information of a plurality of current secondary users to the spectrum management apparatus,
the network side apparatus for managing primary users is further configured to send existence information of a current primary user to the spectrum management apparatus, and
the spectrum management apparatus is further configured to: acquire information of the plurality of current secondary users with respect to a position of the current primary user; acquire a parameter set of a neural network model corresponding to the position of the current primary user; and predict aggregate interference produced by the plurality of current secondary users to the current primary user, by using the information of the plurality of current secondary users as an input to the neural network model corresponding to the position of the current primary user.

16. The spectrum management system according to claim 15, wherein the spectrum management apparatus is further configured to:
perform spectrum management on the plurality of current secondary users according to the predicted aggregate interference produced by the plurality of current secondary users to the current primary user.

17. The spectrum management system according to claim 15, wherein the network side apparatus for managing secondary users comprises a Citizens Broadband Radio Service Device CBSD, the network side apparatus for managing primary users comprises an Environmental Sensing Capability ESC device or a CBSD with sensing capability, the spectrum management apparatus comprises a Spectrum Access System SAS or a Coexistence Manager C×M.

18. A radio communication method performed by a spectrum management apparatus, composing:
acquiring a plurality of pieces of sample information with respect to a position of a sample primary user, each of the plurality of pieces of sample information comprising information of a plurality of sample secondary users and aggregate interference produced by the plurality of sample secondary users to the sample primary user; and
training a neural network model by using the information of the plurality of sample secondary users as an input to the neural network model and using the aggregate interference produced by the plurality of sample secondary users to the sample primary user as an output of the neural network model, to determine a parameter set of a neural network model corresponding to the position of the sample primary user,
wherein the method further comprises:
acquiring information of a plurality of current secondary users with respect to a position of a current primary user;
acquiring a parameter set of a neural network model corresponding to the position of the current primary user; and
predicting aggregate interference produced by the plurality of current secondary users to the current primary user, by using the information of the plurality of current secondary users as an input to the neural network model corresponding to the position of the current primary user.

* * * * *